US009133409B2

(12) United States Patent
Muller et al.

(10) Patent No.: US 9,133,409 B2
(45) Date of Patent: Sep. 15, 2015

(54) COMPOSITIONS CONTAINING FATTY ACIDS AND/OR DERIVATIVES THEREOF AND A LOW TEMPERATURE STABILIZER

(75) Inventors: Dries Muller, Almere (NL); Pedro Lopes, Almere (NL); Mark Brewer, Almere (NL); Erik Kelderman, Alemere (NL); David Broere, Almere (NL)

(73) Assignee: Arizona Chemical Company, LLC, Jacksonville, FL (US)

( * ) Notice: Subject to any disclaimer, the term of this patent is extended or adjusted under 35 U.S.C. 154(b) by 45 days.

(21) Appl. No.: 12/551,087

(22) Filed: Aug. 31, 2009

(65) Prior Publication Data
US 2010/0087656 A1 Apr. 8, 2010

Related U.S. Application Data

(62) Division of application No. 11/393,387, filed on Mar. 29, 2006.

(60) Provisional application No. 60/665,991, filed on Mar. 29, 2005, provisional application No. 60/774,239, filed on Feb. 16, 2006, provisional application No. 60/775,426, filed on Feb. 21, 2006, provisional application No. 60/777,286, filed on Feb. 27, 2006.

(51) Int. Cl.
C07C 53/00 (2006.01)
C10L 10/16 (2006.01)
C10L 1/14 (2006.01)
C10L 1/188 (2006.01)
C10L 1/238 (2006.01)
C10L 10/08 (2006.01)
C10L 10/14 (2006.01)
C11C 3/00 (2006.01)
C11C 3/02 (2006.01)
C10L 1/16 (2006.01)
C10L 1/19 (2006.01)
C10L 1/222 (2006.01)
C10L 1/224 (2006.01)
C10L 1/232 (2006.01)

(52) U.S. Cl.
CPC ............... *C10L 10/16* (2013.01); *C10L 1/143* (2013.01); *C10L 1/1881* (2013.01); *C10L 1/1883* (2013.01); *C10L 1/1885* (2013.01); *C10L 1/1886* (2013.01); *C10L 1/1888* (2013.01); *C10L 1/2381* (2013.01); *C10L 10/08* (2013.01); *C10L 10/14* (2013.01); *C11C 3/003* (2013.01); *C11C 3/02* (2013.01); *C10L 1/1608* (2013.01); *C10L 1/1616* (2013.01); *C10L 1/19* (2013.01); *C10L 1/191* (2013.01); *C10L 1/1905* (2013.01); *C10L 1/224* (2013.01); *C10L 1/2222* (2013.01); *C10L 1/2225* (2013.01); *C10L 1/232* (2013.01); *Y02E 50/13* (2013.01); *Y02T 50/678* (2013.01)

(58) Field of Classification Search
USPC ............ 510/267, 130; 44/385, 403, 393, 395, 44/270; 528/113, 310, 322, 329.1; 530/205, 230; 210/764, 749, 928; 252/182.1; 508/554, 476; 426/604; 554/1
See application file for complete search history.

(56) References Cited

U.S. PATENT DOCUMENTS

| | | | |
|---|---|---|---|
| 2,663,649 A | 12/1953 | Winkler | |
| 3,169,980 A | 2/1965 | Benoit, Jr | |
| 3,563,767 A * | 2/1971 | Wasserman | 426/604 |
| 3,765,850 A | 10/1973 | Badin et al. | |
| 3,896,038 A * | 7/1975 | Hartle | 508/554 |
| 4,178,261 A | 12/1979 | Dhein et al. | |
| 4,519,952 A | 5/1985 | Cleary et al. | |
| 4,816,549 A | 3/1989 | Rumack | |
| 4,863,486 A | 9/1989 | Tack et al. | |
| 5,157,088 A | 10/1992 | Dishong et al. | |
| 5,389,113 A | 2/1995 | Demmering et al. | |
| 5,645,632 A | 7/1997 | Pavlin | |
| 5,656,177 A * | 8/1997 | Werres | 210/764 |
| 5,772,705 A | 6/1998 | Caprotti | |
| 5,783,657 A | 7/1998 | Pavlin et al. | |
| 5,807,949 A | 9/1998 | Rossi et al. | |
| 5,981,680 A | 11/1999 | Petroff et al. | |
| 5,998,570 A | 12/1999 | Pavlin et al. | |
| 6,015,440 A | 1/2000 | Noureddini | |
| 6,063,334 A | 5/2000 | Naraghi | |
| 6,086,645 A | 7/2000 | Quigley et al. | |
| 6,126,757 A | 10/2000 | Kinnaird | |
| 6,127,490 A | 10/2000 | Fazio | |
| 6,133,474 A | 10/2000 | Rasheed et al. | |
| 6,149,013 A | 11/2000 | Hughes | |
| 6,203,585 B1 | 3/2001 | Majerczak | |

(Continued)

FOREIGN PATENT DOCUMENTS

EP 0626442 A1 11/1994
EP 0632123 A1 1/1995

(Continued)

OTHER PUBLICATIONS

Office Action dated Mar. 3, 2009 as issued in U.S. Appl. No. 11/393,387, filed Mar. 29, 2006.
Final Office Action dated Dec. 7, 2009 as issued in U.S. Appl. No. 11/393,387, filed Mar. 29, 2006.
Blaise, P., Farines, M., and Soulier, J., Identification of Cyclopentenyl Fatty Acids by 1H and 13C Nuclear Magnetic Resonance, Laboratoire de Chimie Organique des Substances Naturelles, ACOS Press, JAOCS, vol. 74, No. 6 (1997).

(Continued)

Primary Examiner — Monique Peets

(57) ABSTRACT

The present invention relates to methods of improving the low temperature storage and performance properties of fatty acids and/or derivatives thereof, as well as compositions containing fatty acids and/or derivatives thereof having superior lower temperature storage and performance properties.

15 Claims, 4 Drawing Sheets

(56) References Cited

U.S. PATENT DOCUMENTS

| | | |
|---|---|---|
| 6,235,299 B1 | 5/2001 | King et al. |
| 6,251,146 B1 | 6/2001 | Jackson |
| 6,254,650 B1 | 7/2001 | Dounis |
| 6,258,920 B1 | 7/2001 | Starner et al. |
| 6,262,149 B1 | 7/2001 | Clark et al. |
| 6,268,466 B1 | 7/2001 | MacQueen et al. |
| 6,297,353 B1 | 10/2001 | Fuenzalida Diaz et al. |
| 6,344,573 B1 | 2/2002 | Rohr et al. |
| 6,399,713 B1 | 6/2002 | MacQueen et al. |
| 6,409,778 B1 | 6/2002 | Auschra et al. |
| 6,414,111 B2 | 7/2002 | Huibers et al. |
| 6,458,175 B1 | 10/2002 | Lehmann et al. |
| 6,462,210 B1 | 10/2002 | Diaz et al. |
| 6,465,665 B1 | 10/2002 | Schersl |
| 6,492,458 B1 | 12/2002 | Pavlin |
| 6,544,935 B1 | 4/2003 | Vargo et al. |
| 6,552,160 B2 | 4/2003 | Pavlin |
| 6,593,426 B2 | 7/2003 | Krull et al. |
| 6,623,554 B2 | 9/2003 | Kinnaird |
| 6,846,941 B2 | 1/2005 | Rohr et al. |
| 6,864,349 B2 | 3/2005 | Pavlin et al. |
| 6,870,011 B2 | 3/2005 | MacQueen et al. |
| 6,875,842 B2 | 4/2005 | Fontana |
| 6,956,099 B2 | 10/2005 | Pavlin |
| 7,041,738 B2 | 5/2006 | Krull et al. |
| 2001/0005956 A1 | 7/2001 | Ahmed |
| 2002/0024168 A1 | 2/2002 | Mack et al. |
| 2003/0069388 A1 | 4/2003 | Lawson et al. |
| 2003/0126788 A1* | 7/2003 | Uang et al. ............ 44/275 |
| 2003/0167681 A1 | 9/2003 | Delgado Puche |
| 2004/0010072 A1 | 1/2004 | Krull et al. |
| 2004/0024088 A1 | 2/2004 | Fontana |
| 2004/0123517 A1* | 7/2004 | Caprotti et al. ............ 44/385 |
| 2004/0176559 A1 | 9/2004 | Fontana |
| 2004/0186263 A1 | 9/2004 | Pavlin |
| 2004/0210029 A1 | 10/2004 | Fontana |
| 2004/0226216 A1 | 11/2004 | Krull et al. |
| 2004/0231234 A1 | 11/2004 | May et al. |
| 2004/0231236 A1 | 11/2004 | May et al. |
| 2004/0242835 A1 | 12/2004 | De Cock et al. |
| 2005/0075254 A1 | 4/2005 | Pollock et al. |
| 2005/0097953 A1 | 5/2005 | Judith |
| 2005/0108924 A1 | 5/2005 | Krull |
| 2005/0113266 A1 | 5/2005 | Krull et al. |
| 2005/0126070 A1 | 6/2005 | Krull |
| 2005/0126072 A1 | 6/2005 | Krull et al. |
| 2005/0268530 A1* | 12/2005 | Brewer et al. ............ 44/307 |
| 2006/0009543 A1 | 1/2006 | Fontana |
| 2006/0075680 A1* | 4/2006 | Tort et al. ............ 44/301 |
| 2010/0087656 A1 | 4/2010 | Muller et al. |

FOREIGN PATENT DOCUMENTS

| | | |
|---|---|---|
| EP | 0658629 A1 | 6/1995 |
| EP | 0885948 A2 | 12/1998 |
| EP | 1227143 A1 | 7/2002 |
| EP | 1319704 A1 | 6/2003 |
| EP | 0973850 B1 | 1/2004 |
| EP | 1380635 A2 | 1/2004 |
| EP | 1391498 A1 | 2/2004 |
| EP | 1484385 A1 | 12/2004 |
| EP | 1500691 A2 | 1/2005 |
| EP | 1526167 A2 | 4/2005 |
| EP | 1526168 A1 | 4/2005 |
| EP | 1557441 A2 | 7/2005 |
| GB | 1015354 | 12/1965 |
| GB | 2121807 A | 1/1984 |
| JP | 2002-167585 * | 6/2002 |
| WO | 92/15623 | 9/1992 |
| WO | 94/17160 | 8/1994 |
| WO | 97/04044 | 2/1997 |
| WO | WO98/56884 * | 6/1998 |
| WO | 98/28383 | 7/1998 |
| WO | 99/36489 | 7/1999 |
| WO | 00/01658 | 1/2000 |
| WO | 01/38461 A1 | 5/2001 |
| WO | 03/006157 A2 | 1/2003 |
| WO | 2004/013259 A1 | 2/2004 |
| WO | 2004/101716 A1 | 11/2004 |
| WO | 2005/014766 A2 | 2/2005 |
| WO | 2005/028597 A1 | 3/2005 |
| WO | 2005/030912 A2 | 4/2005 |
| WO | 2005/054314 A2 | 6/2005 |
| WO | 2005/078052 A1 | 8/2005 |
| WO | 2005/123890 A1 | 12/2005 |
| WO | 2006/002683 A1 | 1/2006 |

OTHER PUBLICATIONS

Fehling, S., Schonwiese, S., Klein, E., Mukherjee, K.D., and Weber, N., Preparation of Malvalic and Sterculic Acid Methyl Esters from Bombax munguba and Sterculia foetida Seed Oils, Institut fur Biochemie and Technologie der Fette, ACOS Press, JAOCS, vol. 75, No. 12 (1998).

Dittmar, TH., Ondruschka, B., Pham Thanh HA, Haupt, J., and Lauterbach, M., Production of Standarised Biodiesel—Investigations to Cold Flow Behavior of Fatty Acids Alkyl Esters, Anwendungstechnik, Erdol Erdgas Kohle 199, Jg 2003 Heft 10.

Office Action dated Jul. 15, 2010 as issued in U.S. Appl. No. 11/393,387, filed Mar. 29, 2006.

* cited by examiner

US 9,133,409 B2

COMPOSITIONS CONTAINING FATTY ACIDS AND/OR DERIVATIVES THEREOF AND A LOW TEMPERATURE STABILIZER

REFERENCE TO RELATED APPLICATIONS

The present Application is a Divisional Application of U.S. patent application Ser. No. 11/393,387, filed Mar. 29, 2006, entitled "Compositions Containing Fatty Acids and/or Derivatives Thereof and a Low Temperature Stabilizer", which claims the benefit under 35 USC §119(e) to: U.S. Provisional Patent Application 60/665,991, filed Mar. 29, 2005; U.S. Provisional Patent Application 60/774,239, filed Feb. 16, 2006; U.S. Provisional Patent Application 60/775, 426, filed Feb. 21, 2006; and U.S. Provisional Patent Application 60/777,286, filed Feb. 27, 2006; which are hereby incorporated, in their entirety, herein by reference.

FIELD OF THE INVENTION

The present invention relates to methods of improving the low temperature storage and performance properties of fatty acids and/or derivatives thereof, as well as compositions containing fatty acids and/or derivatives thereof having superior lower temperature storage and performance properties.

BACKGROUND OF THE INVENTION

Fatty acids are important commercial materials and find uses in a myriad of applications. For example, fatty acids may be incorporated into ore flotation compositions (see, e.g., U.S. Pat. Nos. 6,149,013 and 6,133,474); and surfactant compositions (see, e.g., U.S. Pat. No. 6,126,757). In addition, fatty acids are reacted with various chemicals to provide a diverse range of commercially useful materials, e.g., reaction with polyfunctional materials to provide polymers, e.g., reaction with polybasic acids and polyhydric alcohols to provide an alkyd resin (see, e.g., U.S. Pat. Nos. 6,262,149 and 6,127, 490); reaction with polyethyleneamines provides polyamidoamines useful in, e.g., epoxy curing agents (see, e.g., U.S. Pat. No. 6,258,920); reaction with diethanolamine provides diethanolamides useful as, e.g., biocides (see, e.g., U.S. Pat. No. 6,235,299); reaction with polyamines provides intermediates in the formation of corrosion inhibitors (see, e.g., U.S. Pat. No. 6,063,334). This list presents a small fraction of the many commercial uses wherein fatty acids are employed.

The successful handling of fatty acids is therefore an important process. A problem with the handling of fatty acids is that they often do not have satisfactory low temperature handling stability. Handling stability at low temperature is important because the transport and storage of fatty acids often occurs at low temperature, e.g., at less than 25° C., and often at less than 0° C.

Fatty acid as used in many commercial processes is typically a blend of fatty acid structures. The handling instability often observed at low temperatures manifests itself in the precipitation of some or all of the components of the fatty acids. The precipitation of fatty acid components at low temperature is a problem in many instances. For example, when fatty acid is taken from a storage tank to a reaction vessel, it is typically pumped from the storage tank. When components of the fatty acids have precipitated and settled to the bottom of the storage tank, that precipitate is not readily pumped from the tank. Typically, the composition of the precipitated fatty acids is not identical to the composition of the fatty acids as a whole, and therefore the composition of fatty acids that is pumped from a tank containing precipitated fatty acids depends on the temperature of the storage tank. The composition of the fatty acids may, and often does impact the reactivity and performance properties of the fatty acids. Industrial users of fatty acids do not want to have to worry about the temperature of the storage tank when they pull fatty acids from the tank to the reaction vessel.

In addition, a transport tank that contains a mixture of liquid and precipitated fatty acids is obviously more difficult to completely empty than is a tank containing a homogenous fluid mixture of fatty acids. The formation of precipitate can render the discharge process from a storage or transport tank very difficult. Thus, even if the fatty acid is a single component, the formation of crystals within the fatty acids can pose problems to the commercial user.

Maintaining a homogeneous fluid mixture of fatty acids, even at low temperature, is a problem that has previously received some attention. One solution is to provide a heating source to the storage or transport tank. This heating source can be used to maintain, or achieve, a temperature within the tank at which precipitation is not observed. A shortcoming with this particular approach is that heating sources are expensive to install, use, and maintain.

A different solution is to add some solvent to the fatty acid, and in particular a solvent that will dissolve precipitated or crystallizing fatty acid as it forms, thus maintaining a homogeneous solution. A problem with this approach is that a supply of solvent must be maintained, which adds expense and complication to the use of the fatty acids. In addition, the presence of solvent in the fatty acids will impact the "acid number" of the composition, i.e., the number of moles of carboxylic acid groups that are provided by a gram of the composition. Typically, commercial users employ sufficient amount of fatty acid to provide a desired amount of carboxylic acid groups. When the composition contains non-acidic solvent, then the acid number of the composition is less than the acid number of fatty acid alone. The presence of solvent therefore requires the operators of a reaction vessel to be concerned about the concentration of solvent in the fatty acids. As reaction vessel operators already have a lot to be concerned with, the addition of this complication is not welcomed by such operators.

The present invention provides a new solution to this problem, which overcomes the problems associated with those solutions that have been suggested in the past.

SUMMARY OF THE INVENTION

One object of the present invention relates to a composition comprising at least one fatty acid or derivative thereof and at least one low temperature stabilizer. In one embodiment, the fatty acid or derivative thereof may be part of a fatty acid containing composition (FAC). In another embodiment, the low temperature stabilizer (LTS) is a branched chain fatty acid (BCFA). In another embodiment, the LTS is a cyclic fatty acid (CFA). In yet another embodiment, the LTS is a polyamide.

Another embodiment is a method of making a composition by contacting at least one fatty acid or derivative thereof and/or at least one FAC with at least one LTS. In another embodiment, the low temperature stabilizer (LTS) is a branched chain fatty acid (BCFA). In another embodiment, the LTS is a cyclic fatty acid (CFA). In yet another embodiment, the LTS is a polyamide.

Another object of the present invention is a method of improving the low temperature stability and/or low temperature performance of at least one fatty acid or derivative thereof and/or at least one FAC by contacting an effective amount of a LTS therewith. In another embodiment, the low temperature stabilizer (LTS) is a branched chain fatty acid (BCFA). In another embodiment, the LTS is a cyclic fatty acid (CFA). In yet another embodiment, the LTS is a polyamide.

Another object of the present invention is a fuel that is a mixture of at least one fatty acid or derivative thereof or at least one FAC and an LTS. In another embodiment, the low temperature stabilizer (LTS) is a branched chain fatty acid (BCFA). In another embodiment, the LTS is a cyclic fatty acid (CFA). In yet another embodiment, the LTS is a polyamide.

Another object of the present invention is a fuel containing at least one fatty acid or derivative thereof or at least one FAC and an LTS. In another embodiment, the low temperature stabilizer (LTS) is a branched chain fatty acid (BCFA). In another embodiment, the LTS is a cyclic fatty acid (CFA). In yet another embodiment, the LTS is a polyamide.

Another object of the present invention is a fuel additive package containing at least one fatty acid or derivative thereof or at least one FAC and an LTS. In another embodiment, the low temperature stabilizer (LTS) is a branched chain fatty acid (BCFA). In another embodiment, the LTS is a cyclic fatty acid (CFA). In yet another embodiment, the LTS is a polyamide.

Another object of the present invention is a lubricity improver or friction modifier containing at least one fatty acid or derivative thereof or at least one FAC and an LTS. In another embodiment, the low temperature stabilizer (LTS) is a branched chain fatty acid (BCFA). In another embodiment, the LTS is a cyclic fatty acid (CFA). In yet another embodiment, the LTS is a polyamide.

These and other related objects of the present invention are described more fully herein.

DETAILED DESCRIPTION OF THE INVENTION

Figure 1:
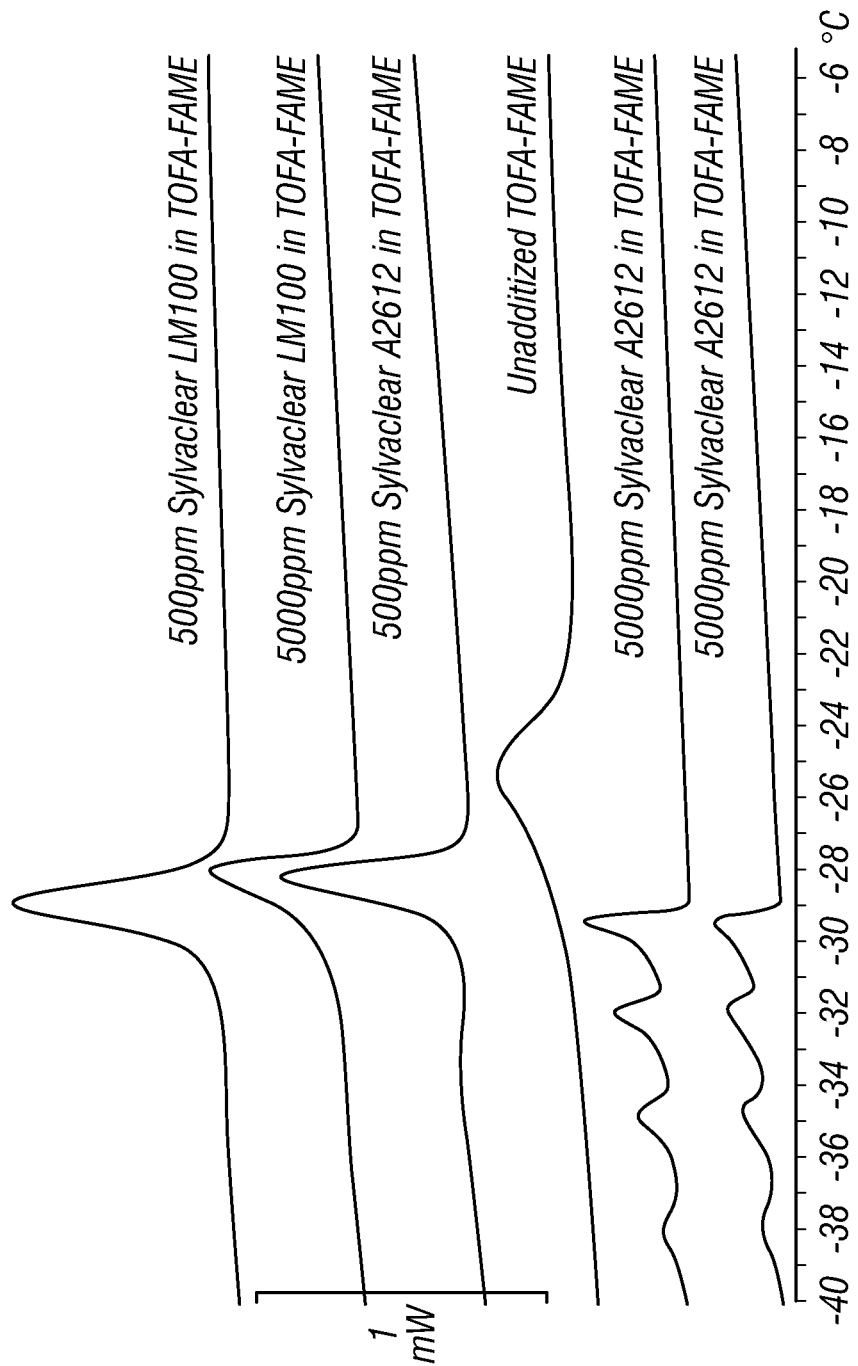
FIG. 1: Representative Differential scanning calorimetry (DCS) as a result of a comparative data study on low temperature stability of the compositions according to the present invention.

The present invention provides a method for improving the low temperature stability of fatty acids, and also provides fatty acid compositions that demonstrate superior low temperature stability.

As used herein, the terms "fatty acid" and "fatty acids", whether in reference to, branched or cyclic fatty acids, are used interchangeably, and both terms refer to one or more compounds of the formula $R^1$—COOH wherein $R^1$ is a hydrocarbon having at least 4 carbon atoms that is optionally substituted with one or more hydroxyl groups, or derivatives thereof. Further, the —COOH group is an acid group. The fatty acid may contain any number of hydroxyl groups and may vary widely based upon the number of carbon atoms present in the fatty acid. For example, the fatty acid may contain at least 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 hydroxyl groups. As used herein, the term hydrocarbon refers to a chemical group formed entirely of carbon and hydrogen. The term "optionally substituted with one or more hydroxyl groups" refers to the replacement of a hydrogen atom of the hydrocarbon with a hydroxyl (—OH) group. The $R^1$ group typically has no more than 99 carbons, so that the fatty acid has a total of no more than 100 carbons. In various embodiments of the invention, the $R^1$ group has at least 5, 6, 7, 8, 9, 10, 11, 12, 13, 14, 15, 16, 17, 18, 19, 20, 21, 22, 23, 24, 25, 26, 27, 28, 29, or 30 carbons. The present invention provides embodiments wherein the maximum number of carbons in the $R^1$ group is, in various embodiments, 99, 90, 80, 70, 60, 50, 40, 39, 38, 37, 36, 35, 34, 33, 32, 31, or 30 carbons. In a preferred embodiment, $R^1$ contains 4-29 carbons, more preferably 7-25 carbons, and most preferably from 15 to 23 carbon atoms.

The fatty acids may contain, n, acid functional groups, where n may be from 1 to 10, preferably from 1 to 6 acid functional groups, more preferably from 1 to 3 acid functional groups.

The "fatty acid" or "fatty acids" of the present invention that are modified to provide enhanced low temperature stability may be a single fatty acid structure or may be a mixture of different fatty acid structures. Regardless of the purity or composition, for convenience in describing the present invention, the fatty acid that is being modified to provide enhanced low temperature stability will be referred to herein as the fatty acid-containing composition, or FAC for short. For instance, the FAC may be pure stearic acid, wherein $R^1$ is $C_{17}$. As used herein "$C_n$" refers to a group having "n" number of carbons. In the case of stearic acid, $R^1$ has 17 carbons. As used herein, "pure" refers to a concentration of fatty acids of 99-100 weight percent of the referenced fatty acids based on the total weight of fatty acids in the mixture/composition/blend.

As referred to herein, the FAC that is modified to provide enhanced low temperature stability is, in various embodiments of the present invention, in admixture with no more than 99 wt % of non-fatty acid material, or, in various other embodiments of the invention, no more than 99, 98, 97, 96, 95, 90, 80%, or 70%, or 60%, or 50%, or 40%, or 30%, or 20%, or 10%, or 5%, or 3%, or 1%, or less than 1% of non-fatty acid material, where these weight percent values are based on the entire weight of the composition to which a low temperature stabilizer (LTS) is added.

As another example, the FAC may be a mixture of fatty acids. That is, a composition containing two or more fatty acids having non-identical $R^1$ groups. For instance, the FAC may contain branched and/or cyclic fatty acids. In a preferred embodiment, the FAC contains a majority, i.e., greater than 50%, of fatty acids, on a weight percent basis, based on the total weight of fatty acids in the composition. In another embodiment, the FAC contains a minority, i.e., less than 50%, of fatty acids, on a weight percent basis, based on the total weight of fatty acids in the composition In one exemplary embodiment of the present invention, the FAC contains predominantly $C_{12-24}$ fatty acids ($R^1$=$C_{11-23}$), while in another embodiment the FAC contains predominantly $C_{16-20}$ fatty acids ($R^1$=$C_{15-19}$). In other exemplary embodiments of the present invention, the FAC contains at least 90% $C_{12-24}$ fatty acids ($R^1$=$C_{11-23}$), while in another embodiment the FAC contains at least 90% $C_{16-20}$ fatty acids ($R^1$=$C_{15-19}$).

Independent of the number of carbons in the hydrocarbon, in various embodiments of the present invention the $R^1$ group may be, branched, or cyclic, and independently may be saturated or unsaturated. The term unsaturated includes both monounsaturated and polyunsaturated, where polyunsaturated includes 2, 3, 4 or more sites of unsaturation. A site of unsaturation is a double bond between two adjacent carbons of $R^1$.

In one aspect of the invention, the $R^1$ groups in the FAC are primarily, i.e., at least 50 mol % of the fatty acids in the FAC have a R1 group. In various embodiments of the present invention, at least 50%, 60%, 70%, 80%, 90% or 95% of the $R^1$ groups in the FAC are saturated. In one aspect, the fatty acids are primarily saturated, i.e., at least 50 mol % of the fatty acids do not have a double bond in the $R^1$ group. Thus, in various embodiments of the present invention, and for each of the above-recited percentage amounts of $R^1$ groups in the FAC, at least 50%, 60%, 70%, 80%, 90%, 95% or 98% of the $R^1$ groups are saturated, with the remainder of the $R^1$ groups being unsaturated.

In another aspect of the invention, the $R^1$ groups in the FAC are primarily cyclic, i.e., at least 50 mol % of the fatty acids in the FAC have a cyclic $R^1$ group. Thus, in various embodiments of the present invention, at least 50%, 60%, 70%, 80%, 90% or 95% of the $R^1$ groups are cyclic. In one aspect, the cyclic fatty acids are primarily unsaturated, i.e., at least 50 mol % of the cyclic fatty acids do not have a double bond in the $R^1$ group. Thus, in various embodiments of the present invention, and for each of the above-recited percentage amounts of cyclic $R^1$ groups in the fatty acids, at least 50%, 60%, 70%, 80%, 90%, 95% or 98% of the $R^1$ groups are unsaturated, with the remainder of the $R^1$ groups being saturated.

In one aspect of the invention, the $R^1$ group is a hydroxyl-substituted hydrocarbon. In one aspect, the hydrocarbon is substituted with a single hydroxyl group. Suitable FAC having hydroxyl-substituted hydrocarbon $R^1$ groups include fatty acids derived from castor oil, e.g., ricinoleic acid and hydroxystearic acids.

The FAC may already contain some BCFA and/or CFA, as defined below as suitable LTSs for the FAC, prior to the addition of the LTS according to one aspect of the present invention. However, if the FAC does contain some BCFA and/or CFA in addition to fatty acid that is/are not branched (non-BCFA) or cyclic (non-CFA), then the ratio of non-BCFA:BCFA in the FAC is preferably is at least 60:40 or 70:30 or 80:20 or 90:10 or 95:05 or 98:02 or 99:01 or the BCFA is less than 1 weight percent of the fatty acid in the FAC, and non-CFA:CFA in the FAC is preferably 80:20 or 90:10 or 95:05 or 98:02 or 99:01 or the CFA is less than 1 weight percent of the fatty acid in the FAC If the FAC contains some BCFA and/or CFA prior to addition of more BCFA and/or CFA as LTSs according to the present invention, the addition of more BCFA and/or CFA as LTSs according to the present invention should improve the low temperature stability of the mixture compared to the FAC.

In an additional embodiment, the FAC may contain a major portion of BCFA. For example, in some cases, distillation products of tall oil compositions and/or derivatives thereof may contain high amounts of BCFA as a major portion of the FAC. In some such cases the non-BCFA:BCFA in the FAC may be at most 60:40 or 50:50 or 40:60 or 30:70 or 20:80 or 10:90 or more than 99 weight percent of the fatty acid in the FAC. Examples of such compositions may be Monomer and isostearic acid. An example of Monomer is that which has been assigned CAS Registry Number 68955-98-6.), which is an alternative and distinct product from TOFA. Discussions of the differences between TOFA and Monomer can be found in United States Published Patent Application Numbers 20060009543; 20050075254; 20040242835; 20040210029; 20040176559; and 20040024088, which are all hereby incorporated, in their entirety, herein by reference. One example of such a commercially available FAC having a majority of BCFA of the total fatty acid content is Century MO-6 sold by Arizona Chemical Company. In a preferred aspect of this embodiment, the LTS is a polyamide and a CFA, more preferably a polyamide, as described herein and added in the amounts as described herein.

Since BCFA contains at least one acid functionality similar to the fatty acids discussed above, derivations of the BCFA may exist such as those described for the fatty acid above. Therefore, in another aspect, the BCFA may be a derivative of BCFA, such as for example an ester- or nitrogen-containing derivative of BCFA when present in the FAC. Examples of FAC's containing derivatives of BCFA are, without limitation, Monomer Esters. Examples of such would be esters of Century MO-6. Some exemplified esters may be Monomer glycerol esters, Monomer methyl esters, and Monomer trimethylolpropane (TMP)-esters which are commercially available for example from Arizona Chemical Company as Uniflex product lines such as Uniflex 1803, Uniflex 336, and Uniflex 936. Also, such fatty acid esters may be those derived from natural sources, such as those described in and/or made by processes and mechanisms described in *Biochemistry 5<sup>th</sup> edition*, by Lubert Stryer et al. (2002) published by W. H. Freeman and Company.

Thus, in one exemplary embodiment of the present invention, the FAC contains from 10-80% mono-saturated fatty acids, 10-80% poly-unsaturated fatty acids, 0-50% saturated fatty acids, and 0-50% cyclic fatty acids. In another exemplary embodiment of the present invention, the FAC contains 40-60% mono-saturated fatty acids, 40-60% poly-unsaturated fatty acids, less than 5% saturated fatty acids, and less than 10% cyclic fatty acids. In yet another exemplary embodiment of the present invention, the FAC contains 25-35% mono-unsaturated fatty acids, 55-70% poly-unsaturated fatty acids, less than 5% saturated fatty acids, and less than 10% cyclic fatty acids. In these embodiments, a preferred cyclic fatty acid is one, or a mixture of, resin acids.

Fatty acids may be saturated or unsaturated and the FACs of the present invention may contain one or the other or mixtures of both saturated and unsaturated fatty acids.

Saturated fatty acids include, without limitation, valeric acid, caproic acid, enanthic acid, caprylic acid, pelargonic acid, capric acid, lauric acid, myristic acid, palmitic acid, margaric acid, stearic acid, arachidic acid, behenic acid, lignoceric acid, cerotic acid, montanic acid, and melissic acid.

Fatty acids may be mono- or poly-unsaturated fatty acids and the FACs of the present invention may contain one or the other or mixtures of both mono- and poly-unsaturated fatty acids.

For example, unsaturated fatty acids include, without limitation, caproleic acid, palmitoleic acid, oleic acid, vaccenic acid, eladic acid, brassidic acid, erucic acid, and nervonic acid.

For example, polyunsaturated fatty acids include, without limitation, linoleic acid, pinoleic acid, linolenic acid, eleostearic acid, and arachidonic acid.

Cyclic fatty acids (CFA) include, without limitation, rosin and/or resin acids, where such acids include, for example, abietic acid, levopimaric acid, neoabietic acid, palustric acid, dehydroabietic acid, isopimaric acid, sandaracopimaric acid, pimaric acid, communic acid, and secodehydroabietic acid. Other sources of cyclic fatty acids include Tall Oil, Tall Oil Heads, Distilled Tall Oil, Pitch, and Rosin, where each of these materials is a product of the distillation of naval stores. See, e.g., *Naval Stores—Production, Chemistry and Utilization*, D. F. Zinkel and J. Russel (eds.), Pulp. Chem. Assoc.

Inc., 1989. Further examples of CFA and derivatives thereof include those derived from or sourced from wood rosin and/or gum rosin, including, but not limited to, esters thereof, for example. In one embodiment of the present invention, the CFA are and/or are derived from resin and/or rosin acids. Examples of rosin acids may include those mentioned in U.S. Pat. Nos. 6,875,842; 6,846,941; 6,344,573; 6,414,111; 4,519,952; and 6,623,554, which are hereby incorporated, in their entirety, herein by reference.

CFA also includes the internal cyclization product of fatty acid. When unsaturated fatty acid is heated, particularly in the presence of clay catalysts as occurs during formation of polymerized fatty acid, the unsaturated fatty acid may undergo an internal cyclization reaction and thereby form a cyclic fatty acid. Such cyclic fatty acids are CFA's according to the present invention. See, e.g., *Naval Stores—Production, Chemistry and Utilization*, D. F. Zinkel and J. Russel (eds.), Pulp. Chem. Assoc. Inc., 1989.

The FAC that may be modified according to the present invention to enhance its low temperature stability can be derived from suitable naturally occurring or synthetic fatty acids and can be saturated or unsaturated, including positional and geometric isomers. Naturally occurring fats and oils can serve as the source for the FAC. Rapeseed oil is a good source for erucic acid, where rapeseed oil typically contains about 30-50 weight percent erucic acid. Erucic acid as found in rapeseed oil may be readily converted by hydrogenation to behenic acid. Rapeseed oil is also a good source for $C_{22}$ fatty acid. $C_{16}$-$C_{18}$ fatty acids can be provided by tallow, soybean oil or cottonseed oil. Shorter chain fatty acids and oils can be provided by coconut, palm kernel or babassu oils. Castor oil, corn oil, lard, linseed oil, olive oil, palm oil, peanut oil, safflower seed oil, sesame oil, sunflower seed oil, tall oil, tallow, and (menhaden) fish oil are examples of other natural oils which can serve as the source of the fatty acids.

The fat or oil may be hydrogenated to provide the corresponding saturated fat or oil. For example, hydrogenated soybean fatty acid is predominantly stearic acid, generally from about 83 percent to about 93 percent by weight. Other fatty acid sources having more than about 75 weight percent stearic acid after hydrogenation include corn oil, cottonseed oil, olive oil, peanut oil, canola (low erucic rapeseed) oil, safflower oil, sesame oil, sunflower oil and mixtures thereof.

In various embodiments of the invention, the FAC may be derived from vegetable, animal or fish sources. In one aspect the FAC is derived from vegetable sources, where suitable vegetable sources include, without limitation, nut oils, crambe, meadow foam, lesquerella, grapeseed, hemp seed, jojoba, tung oil, flaxseed, camelina, jatropha oil, and marine algal oils. In another aspect, the FAC is derived from animal oil, where suitable animal oils include, without limitation, lard and poultry grease. In another aspect, the FAC is derived from a fish oil, where suitable fish oils include, without limitation, menhaden, sardine, and herring oils.

Suitable FAC are available from many commercial suppliers, e.g., Uniqema (division of ICI; New Castle, Del. USA; www.uniqema.com); Cognis Corp USA (division of Cognis BV; Cincinnati, Ohio USA; www.cognis.com); Akzo Nobel Inc. (Chicago, Ill. USA; www.akzonobelusa.com); Croda International Plc (East Yorkshire, U.K.; www.croda.com); Arizona Chemical (Jacksonville, Fla. USA; www.arizonachemical.com); Georgia Pacific (Atlanta, Ga. USA; www.gp.com); Hercules (Wilmington, Del. USA; www.hercules.com); and Westvaco Corporation, Chemical. Division (Charleston Heights, S.C. USA; http://www.westvaco.com).

Derivatives of the fatty acid may be any commonly known derivative of a carbonyl-containing compound known in general Organic Chemistry Textbooks, such as "Organic Chemistry", 5th Edition, by Leroy G. Wade, which is hereby incorporated, in its entirety, herein by reference. Examples of derivatives of the fatty acid may be an ester thereof or nitrogen-containing derivative thereof such as a nitrile, amide, or amine carboxylate thereof, as well as those commonly found in black liquor solids, soaps, skimmings, as well as tall oil products such as pitch and/or distillate products thereof.

One aspect of the present invention relates to ester containing derivatives of the fatty acid (fatty acid esters). Such derivatives may contain at least one ester of the fatty acid such as those discussed in WO 2005/028597, which is hereby incorporated, in its entirety, herein by reference. The ester containing fatty acid may be of the formula: $R^1$—$COOR^2$, where $R^1$ is as discussed above and $R^2$ may be a substituted or unsubstituted hydrocarbon containing from 1 to 30 carbon atoms. $R^2$ may contain 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, including any and all ranges and subranges therein.

The —$COOR^2$ is an ester functional group. The fatty acid derivative may contain, m, ester functional groups, where m may be from 1 to 10, preferably from 1 to 6 ester functional groups, more preferably from 1 to 3 ester functional groups. Even further, the fatty acid derivative my contain only n acid functional groups as discussed above, only m ester functional groups, or a mixture of n acid functional groups as discussed above and m ester functional groups.

In one preferred embodiment, $R^2$ is a short chain alkyl group, including but not limited to a methyl, ethyl, propyl, isopropyl, butyl, sec-butyl, iso-butyl, and tert-butyl group; the most preferred being methyl. According to such most preferred example of this embodiment, the resultant ester containing fatty acid would be a fatty acid methyl ester (FAME).

In another preferred embodiment, $R^2$ is a hydrocarbon substituted with one or more alcohol groups such as that described for $R^1$ above, including but not limited to polyols, glycols, etc. Examples include but are not limited to glycerol and ethylene gylcol. According to such an example of this embodiment, the resultant ester containing fatty acid would be a fatty acid glyceryl ester. To create the above mentioned fatty acid esters, the fatty acid discussed above may be, for example, reacted with an $R^2$ precursor where the $R^2$ may be, but is not limited, to a hydrocarbon substituted with one or more alcohol groups. When this occurs in this non-limiting example, at least one fatty acid having the above $R^1$—COOH formula may be reacted and covalently bound to an $R^2$ precursor where the $R^2$ may be, but is not limited, to a hydrocarbon substituted with one or more alcohol groups.

For example, a mono fatty acid ester may be produced if one fatty acid having the above $R^1$—COOH formula is reacted and covalently bound to an $R^2$ precursor where the $R^2$ may be, but is not limited, to a hydrocarbon substituted with one or more alcohol groups. Further, a difatty acid ester may be produced if two fatty acids having the above $R^1$—COOH formula is reacted and covalently bound to one $R^2$ precursor where the $R^2$ may be, but is not limited, to a hydrocarbon substituted with one or more alcohol groups. Still further, a trifatty acid ester may be produced if three fatty acids having the above $R^1$—COOH formula is reacted and covalently bound to one $R^2$ precursor where the $R^2$ may be, but is not limited, to a hydrocarbon substituted with one or more alcohol groups. These examples are not meant to be limiting but to exemplify that the number of fatty acids that can covalently react via as ester linkage with the $R^2$ precursor can be any number of fatty acids up until all of the alcohol groups of the $R^2$ precursor are depleted.

In an additional non-limiting example, a fatty acid may be reacted with glycerol which has three alcohol groups (i.e. the $R^2$ precursor). According to the above exemplified embodiment the fatty acid may be reacted with glycerol in a manner to create a fatty acid derivative wherein the fatty acid derivative (only by a non-limiting example), may be a monofatty acid glycerol ester, a difatty acid glycerol ester, and a trifatty acid glycerol ester.

In a preferred aspect of the present invention, the FAC is a distillation product from tall oil, and the FAC includes fatty acids commonly associated with tall oil fatty acids (TOFA). In one aspect, the FAC contains TOFA. Many of the above-listed suppliers also sell TOFA. Further, the FAC may contain crude tall oil (CTO) and/or distilled tall oil (DTO). Examples of tall oil product sources are those commercially available from Arizona Chemical Company, including commercially available Sylfat products from Arizona Chemical Company, more specifically Sylfat 2 or Sylfat 2LT. Still preferred fatty acid containing compositions may be North American TOFA or distillates thereof, Scandanavian TOFA or distillates thereof, including blends of each. Still further, each of these fatty acid containing compositions may be esterified as discussed above, preferably methyl and/or glyceryl esters thereof.

The fatty acid ester may be any ester found in and/or extracted from and/or derived from naturally occurring sources. Further examples of such fatty acid esters may be those described in and/or made by processes and mechanisms described in *Biochemistry* $5^{th}$ edition, by Lubert Stryer et al. (2002) published by W. H. Freeman and Company.

Addition examples of fatty acids and derivatives thereof, as well as the exemplified FACs, are described in WO1994017160; WO2006002683; and WO2005123890, which are hereby incorporated, in their entirety, herein by reference.

Additional FAC's are those already having considerable low temperature stability, including those described in WO 2004/013259, which is hereby incorporated, in its entirety, herein by reference.

The FAC may also be, for example, a fuel or biofuel, such as those described below. Accordingly, in one embodiment of the present invention, the LTS may be added directly to the fuel or biofuel to improve the fuel's or biofuel's low temperature stability. Therefore, the fuel or biofuel may act as the FAC, for example, in one aspect as defined herein.

Although the FAC may contain any amount of sulfur, preferably the FAC contains low amounts of sulfur. Methods of making low sulfur TOFA products are described in U.S. Provisional Patent Application No. 60/708,425, entitled "LOW SULFUR TALL OIL FATTY ACID", filed Aug. 15, 2005, which is hereby incorporated, in its entirety, herein by reference. Preferably, the FAC contains less than 500 ppm of sulfur, more preferably less than 200 ppm, even more preferably less than 100 ppm, and most preferably not more than 50 ppm sulfur based upon the total weight of the composition. The compositions may be low sulfur and/or ultra low sulfur compositions such as compositions containing at most 25 ppm, at most 15 ppm, at most 10 ppm, and/or at most 5 ppm sulfur based upon the total weight of the compositions. The sulfur content includes any volatile and/or non-volatile sulfur containing species and/or compounds, including those that are either organic and/or inorganic sulfur containing compounds. The composition may contain not more than 500, 450, 400, 350, 300, 250, 200, 150, 100, 50, 45, 40, 35, 30, 25, 22, 20, 18, 15, 12, 10, 8, 6, 5, 4, 3, 2, 1, 0.1, 0.01, and/or 0.001 ppm of sulfur, including any and all ranges and subranges therein. In some aspects of the invention, the composition may be sulfur free or essentially sulfur free by containing no and/or trace amounts of sulfur.

In one embodiment, the FAC may contain at least one unsaponifiable material. Examples of unsaponifiable materials is found, but not limited to, those described in U.S. Pat. Nos. 6,875,842; 6,846,941; 6,344,573; 6,414,111; 4,519,952; 6,623,554; 6,465,665; 6,462,210; and 6,297,353 which are hereby incorporated, in their entirety, herein by reference. Unsaponifiable material may be any neutral material that is not capable of being saponified, or ester thereof.

According to the present invention, a low temperature stabilizer (LTS) is added to the fatty acid composition (FAC) as described above. For the present invention, the low temperature stabilizers (LTSs) include branched chain fatty acid (BCFA), Cyclic fatty acid (CFA), and polyamides. The LTS may be any one mixture of branched chain fatty acid (BCFA), Cyclic fatty acid (CFA), and polyamides.

According to the present invention, branched chain fatty acid (BCFA) is added to a fatty acid composition as described above, to thereby provide a fatty acid mixture having improved low temperature performance compared to the FAC (fatty acid composition). In one aspect of the invention, the BCFA is a saturated BCFA that may be described by the following formula, wherein each of x, y, and z is independently selected from 0-26: $CH_3$—$(CH_2)_x$—$CH[(CH_2)_y CH_3]$—$(CH_2)_z$—$COOH$ wherein x+y+z=6-26. In various embodiments of the invention, x+y+z=6, or 7, or 8, or 9, or 10, or 11, or 12, or 13, or 14, or 15, or 16, or 17, or 18 as the lower limit on the number of carbon atoms represented by the sum of x, y and z. Independently, for each of these embodiments, the upper limit of the sum x, y and z is 26, or 25, or 24, or 23, or 22, or 21, or 20, or 19. In various embodiments of the invention, y+z=6, or 7, or 8, or 9, or 10, or 11, or 12, or 13, or 14, or 15, or 16, or 17, or 18 as the lower limit on the number of carbon atoms represented by the sum of y and z. Independently, for each of these embodiments, the upper limit of the sum y and z is 26, or 25, or 24, or 23, or 22, or 21, or 20, or 19. In various embodiments of the invention, x+y=6, or 7, or 8, or 9, or 10, or 11, or 12, or 13, or 14, or 15, or 16, or 17, or 18 as the lower limit on the number of carbon atoms represented by the sum of x and y. Independently, for each of these embodiments, the upper limit of the sum x and y is 26, or 25, or 24, or 23, or 22, or 21, or 20, or 19.

Examples which come within this group and are offered commercial are: 2 methylpropanoic (isobutyric)—(Hoechst, Eastman); 2 methylbutanoic (isopentanoic)—(Union Carbide); 3 methylbutanoic (isovaleric)—(Hoechst); 2,2 dimethylpropanoic (neopentanoic)—(Exxon); isooctanoic—(Hoechst); 2 ethylhexanioc—(Eastman, Union Carbide); and 2,2 dimethyloctanoic (neodecanoic)—(Exxon).

The BCFA of the present invention contains at least one branch point on the carbon chain of the fatty acid. However, the BCFA may contain more than one branch point and still be a BCFA according to the present invention. For instance, a BCFA may have two or more methyl substituents, or two or more ethyl substituents, or one methyl and one ethyl substituent, etc. In one aspect of the invention, the BCFA is a mono-unsaturated branched chain fatty acid. In another aspect of the invention, the BCFA is a poly-unsaturated branched chain fatty acid.

BCFA and CFA can be obtained from many sources. For instance, suppliers of fine and bulk chemicals may sell BCFA and CFA. See, e.g., Acros Organics (Pittsburgh Pa.), Aldrich Chemical (Milwaukee Wis., including Sigma Chemical and Fluka), Apin Chemicals Ltd. (Milton Park UK), Avocado Research (Lancashire U.K.), BDH Inc. (Toronto, Canada), Bionet (Cornwall, U.K.), Chemservice Inc. (West Chester Pa.), Crescent Chemical Co. (Hauppauge N.Y.), Eastman Organic Chemicals, Eastman Kodak Company (Rochester N.Y.), Fisher Scientific Co. (Pittsburgh Pa.), Fisons Chemicals (Leicestershire UK), Frontier Scientific (Logan Utah), ICN Biomedicals, Inc. (Costa Mesa Calif.), Key Organics (Cornwall U.K.), Lancaster Synthesis (Windham N.H.), Maybridge Chemical Co. Ltd. (Cornwall U.K.), Parish Chemical Co. (Orem Utah), Pfaltz & Bauer, Inc. (Waterbury Conn.), Polyorganix (Houston Tex.), Pierce Chemical Co. (Rockford Ill.), Riedel de Haen A G (Hannover, Germany), Spectrum Quality Product, Inc. (New Brunswick, N.J.), TCI America (Portland Oreg.), Trans World Chemicals, Inc. (Rockville Md.), and Wako Chemicals USA, Inc. (Richmond Va.), to name a few.

The above-listed chemical suppliers may also sell the corresponding alcohols, i.e., compounds of the formula $R^1$—$CH_2$—OH, which can be oxidized to the desired BCFA or CFA by techniques well known in the art (see, e.g., Fuhrhop, J. and Penzlin G. "Organic Synthesis: Concepts, Methods, Starting Materials", Second, Revised and Enlarged Edition (1994) John Wiley & Sons ISBN: 3-527-29074-5; Hoffman, R. V. "Organic Chemistry, An Intermediate Text" (1996) Oxford University Press, ISBN 0-19-509618-5; Larock, R. C. "Comprehensive Organic Transformations: A Guide to Functional Group Preparations" 2nd Edition (1999) Wiley-VCH, ISBN: 0-471-19031-4; March, J. "Advanced Organic Chemistry: Reactions, Mechanisms, and Structure" 4th Edition (1992) John Wiley & Sons, ISBN: 0-471-60180-2; Patai, S. "Patai's 1992 Guide to the Chemistry of Functional Groups" (1992) Interscience ISBN: 0-471-93022-9; Solomons, T. W. G. "Organic Chemistry" 7th Edition (2000) John Wiley & Sons, ISBN: 0-471-19095-0; Stowell, J. C., "Intermediate Organic Chemistry" 2nd Edition (1993) Wiley-Interscience, ISBN: 0-471-57456-2; "Industrial Organic Chemicals: Starting Materials and Intermediates: An Ullmann's Encyclopedia" (1999) John Wiley & Sons, ISBN: 3-527-29645-X, in 8 volumes; "Organic Reactions" (1942-2000) John Wiley & Sons, in over 55 volumes; and "Chemistry of Functional Groups" John Wiley & Sons, in 73 volumes.)

A preferred BCFA and CFA is a by-product of dimer acid production. The dimerization of fatty acids, and particular TOFA, to produce dimer acid, is well known in the art. See, e.g., *Naval Stores—Production, Chemistry and Utilization*, D. F. Zinkel and J. Russel (eds.), Pulp. Chem. Assoc. Inc., 1989. At the end of the dimerization process, during purification of the dimer acid, a mono-carboxylic acid distillation product is typically obtained, where this distillation product is commonly referred to in the art as monomer acid or simply as "monomer". Monomer is typically a mixture of branched, aromatic, cyclic, and straight chain fatty acids, which may be saturated or unsaturated. The predominant acid in monomer is iso-oleic acid, a mixture of branched and cyclic $C_{18}$ mono-unsaturated fatty acids. The iso-oleic acid may be refined from monomer by low temperature solvent separation, in order to prepare a purified iso-oleic acid. Both monomer and the purified iso-oleic acid is a BCFA of the present invention, where iso-oleic acid of about 90% purity is a preferred BCFA of the invention. Noteworthy is that, as this example illustrates, BCFA need not be a pure material, but may be in admixture with other materials, even fatty acids that are not branched and/or polyamides.

Either of monomer or the purified iso-oleic acid may be subjected to a hydrogenation process to provide the corresponding saturated BCFA, where either of these saturated BCFAs are a BCFA of the present invention. Hydrogenated iso-oleic acid is also known as iso-stearic acid.

Dimer acid is produced by many companies that generally produce products based on naval stores. Arizona Chemical (Jacksonville, Fla. USA; www.arizonachemical.com); Cognis Corp USA (division of Cognis BV; Cincinnati, Ohio USA; www.cognis.com); Hercules (Wilmington, Del. USA; www.herc.com); and Westvaco Corporation, Chemical Division (Charleston Heights, S.C. USA; http://www.westvaco.com) are four examples. These companies, and others, also sell Monomer and/or refined iso-oleic acid and/or the hydrogenation products thereof. For example, Arizona Chemical sells their CENTURY® fatty acids, which typically include BCFA. Whether a particular fatty acid contains BCFA or CFA can be readily determined by someone with skill in the art by subjecting a sample of the fatty acid to gas chromatography and/or mass spectrometry, and comparing the resulting chromatogram or mass spectrum to the chromatogram or spectrum of the corresponding pure, i.e., reference material.

Other methods of producing BCFA and CFA may be found in, e.g., "Fatty Acids in Industry" Chapters 7 and 11, edited by R. W. Johnson and E. Fritz, M. Dekker, New York, 1989, ISBN 0824776720.

In one aspect, the BCFA is or includes $CH_3$—$CH[(CH_2)_y CH_3]$—$(CH_2)_z$—COOH wherein y+z=6-26 and y=0, i.e., the BCFA is an "iso-acid". In one aspect, the iso-acid contains a total of 6-30 carbons. Iso-oleic and iso-stearic are two preferred iso-acid BCFAs of the present invention. The preferred branching in a BCFA is either a methyl or an ethyl branch.

In order to determine this amount for a particular sample of LTS and FAC, the LTS and FAC can be combined in various ratios, and the resulting mixtures monitored for their low temperature stability. In a preferred embodiment when the LTS is a BCFA and/or CFA, it may be combined with the FAC at weight ratios of from 1:1 to 0.001:1. The LTS/FAC weight ratio may be 1:1; 0.8:1; 0.6:1; 0.4:1; 0.2:1 0.1:1; 0.09:1; 0.08:1; 0.07:1; 0.06:1; 0.05:1; 0.04:1; 0.03:1; 0.02:1; 0.01:1; 0.008:1; 0.006:1; 0.004:1; 0.002:1; 0.001:1; and 0.0001:1, including any and all ranges and subranges therein. The low temperature stability of each of these mixtures may then be determined by, e.g., measuring the cloud point of each mixture. Armed with this information, one of ordinary skill in the art can identify a blend of LTS and FAC that affords the desired low temperature stability for the particular environment of interest. In addition to the particular environment to which the mixture will be exposed, economic factors must, as always, be considered in determining the "best" blend, and accordingly no single weight ratio of LTS to FAC will always be best. However, typically, a weight ratio on the order to 0.1:1 to 0.0001:1 is suitable, i.e., on the order of 10.0-0.0001 weight percent LTS in the mixture of LTS and FAC.

In another embodiment of the present invention, the LTS may be a polyamide. Any polyamide is suitable, so long as it is soluble and/or made fully and/or partially soluble in the fuel, preferably diesel fuel, a solvent, the FAC, and/or a co-solvent. Further, preferred polyamides contain greater than or equal to 50% equivalents of polymerized fatty acid. A most preferred polyamide has a low softening point, is soluble and/or made fully and/or partially soluble in fatty acids or FAC, and does not cause gelling when in contact with a fatty acid.

The polyamide may be a reaction product of polyacids and/or di-acids with polyamines and optionally alcohols, preferably optionally polyalcohols.

An example of the polyacid or di-acid may be, but is not limited to, a polymerized fatty acid. Further examples of the di-acid may be isophthalic acid, sebacic acid, adipic acid, maleic acid, fumaric acid, and maleic anhydride. Further, the polyacids or diacids may be hydrogenated or non-hydrogenated or mixtures of both. Further, exemplified polyacids are those described created from polymerizing any of the above-described fatty acids or derivatives thereof, including the BCFAs and/or the CFAs described above.

An example of the polyamine is a diamine, more preferably ethylene diamine or EDA. Further examples of the diamine are HMDA—Hexamethylenediamine, DETA—Diethylenetriamine, TETA—triethylenetetraamine, TEPA—tetraethylenepentaamine, Jeffamines, piperazines, diaminecyclohexanes, meta-xylylenediamine, and iso-phoronediamine.

An example of a polyalcohol is a di-alcohol, such as neopentyl glycol or NPG.

The reaction product may also optionally contain a termination group. Examples of such termination groups are, but are not limited to, alcohols, amines, acids, isocyanates, and epoxys.

The polyamide may be any molecular weight so long as it is soluble and/or made fully and/or partially soluble in the fuel, preferably diesel fuel, a solvent, the FAC, and/or a co-solvent. Preferred examples of controlling the molecular weight of the polyamide is by terminating the polyamide polymer with a mono-carboxylic acid, a mono-amine (primary or secondary), and/or a mono-alcohol.

Examples of a mono-carboxylic acid are those of the formula $R^1COOH$, where $R^1$ is C1-20 hydrocarbon, linear, branched or cyclic, and/or is optionally substituted. Such acids include, for example, acetic acid, propanoic acid, iso-butyric acid, butanoic acid, stearic acid, oleic acid, TOFA, and Monomer. An optionally substituted hydrocarbon refers to a hydrocarbon optionally substituted with one or more functional groups selected from hydroxyl, bromo, fluoro, chloro, iodo, mercapto, cyano, alkylthio, heterocyclyl, aryl, heteroaryl, carboxyl, alkyl, alkenyl, nitro, amino, alkoxyl, and/or amido.

Examples of the mono-amine include those having the formula $R^1R^2NH$, where R' and/or $R^2$ are independently a hydrogen or a $C_{2-30}$ hydrocarbon that may be linear, branched or cyclic and/or is optionally substituted. Such mono-amines include, but is not limited to, an alkylamine, ditallow-amine, and DMEDA-dimethylethylenediamine. An optionally substituted hydrocarbon refers to a hydrocarbon optionally substituted with one or more functional groups selected from hydroxyl, bromo, fluoro, chloro, iodo, mercapto, cyano, alkylthio, heterocyclyl, aryl, heteroaryl, carboxyl, alkyl, alkenyl, nitro, amino, alkoxyl, and/or amido.

Examples of mono-alcohols include those having the formula $R^1OH$ where R1 is a $C_{1-30}$ hydrocarbon that may be linear, branched or cyclic and/or is optionally substituted. An optionally substituted hydrocarbon refers to a hydrocarbon optionally substituted with one or more functional groups selected from hydroxyl, bromo, fluoro, chloro, iodo, mercapto, cyano, alkylthio, heterocyclyl, aryl, heteroaryl, carboxyl, alkyl, alkenyl, nitro, amino, alkoxyl, and/or amido.

Some preferred examples of polyamides, their compositions, and methods of making the polyamides which are contained by the composition of the present invention are those found, for example, in U.S. Pat. Nos. 5,645,632; 5,783,657; 5,998,570; 6,268,466; 6,399,713; 6,492,458; 6,552,160; 5,981,680; 4,816,549; 6,870,011; 6,864,349; and 6,956,099; as well as US Published Patent Application 20040186263, which are hereby incorporated, in their entirety, herein by reference. The more preferred polyamides are Ester-Terminated PolyAmides (ETPAs), Tertiary-Amide-Terminated PolyAmides (ATPAs), Ester-Terminated PolyEster-Amides (ETPEAs), Tertiary Amide-Terminated PolyEster-Amides (ATPEA), PolyAlkyleneOxy-terminated PolyAmides (PAO-PAs), and PolyEther-PolyAmides (PEPAs), most preferably ETPA, ETPEAs, and ATPAs. These preferred polyamides are not EVA (Ethyl Vinyl Acetate)-based polyamides, nor are they prepared from Ethyl Vinyl Acetate-containing structures. Examples of such EVA technologies can be found described in WO1997004044, which is hereby incorporated, in its entirety, herein by reference.

One preferred class of polyamide as the LTS is an Ester-Terminated PolyAmide (ETPA). ETPAs are resin compositions containing at least one compound of formula (1):

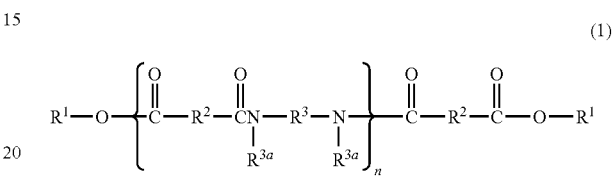

(1)

wherein n designates a number of repeating units such that ester groups constitute from 10% to 50% of the total of the ester and amide groups; $R^1$ at each occurrence is independently selected from an alkyl or alkenyl group containing at least 4 carbon atoms; $R^2$ at each occurrence is independently selected from a $C_{4-42}$ hydrocarbon group with the proviso that at least 50% of the $R^2$ groups have 30-42 carbon atoms; $R^3$ at each occurrence is independently selected from an organic group containing at least two carbon atoms in addition to hydrogen atoms, and optionally containing one or more oxygen and nitrogen atoms; and $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$, such that at least 50% of the $R^{3a}$ groups are hydrogen. Preferably, the resin composition further contains a diester having formula (1) wherein n=0, such that the ratio of ester groups to the sum of ester and amide groups in the total of the ester-terminated polyamide and diester is from 0.1 to 0.7. Preferably, the resin composition is at reaction equilibrium.

Methods of making the above-mentioned ETPA compositions may be found, for example, in U.S. Pat. No. 5,783,657, which is hereby incorporated, in its entirety, herein by reference.

Another preferred class of polyamide as the LTS is tertiary amide terminated polyamide (ATPA). ATPAs are resin compositions containing at least one compound of formula (2):

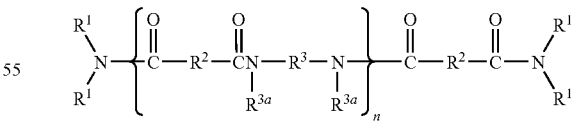

where, n designates a number of repeating units such that terminal amide groups (i.e., the amide groups to which $R^1$ is directly bonded) constitute from 10% to 50% of the total amide groups of the ATPA; $R^1$ at each occurrence is independently selected from a $C_{1-22}$ hydrocarbon group; $R^2$ at each occurrence is independently selected from a $C_{2-42}$ hydrocarbon group; $R^3$ at each occurrence is independently selected from an organic group containing at least two carbon atoms in addition to hydrogen atoms, and optionally containing one or more oxygen and nitrogen atoms; and $R^{3a}$ at each occurrence is independently selected from hydrogen, $C_{1-10}$ alkyl and a direct bond to $R^3$ or another $R^{3a}$ such that the N atom to which $R^3$ and $R^{3a}$ are both bonded is part of a heterocyclic structure defined in part by $R^{3a}$—N—$R^3$.

Methods of making the above-mentioned ATPA compositions may be found, for example, in U.S. Pat. No. 6,268,466, which is hereby incorporated, in its entirety, herein by reference.

Another preferred class of polyamide as the LTS is Ester-Terminated PolyEster-Amides (ETPEAs). ETPEAs are resin compositions prepared by reacting components comprising dibasic acid, diamine, polyol and monoalcohol, where (a) at least 50 equivalent percent of the dibasic acid comprises polymerized fatty acid; and (b) at least 50 equivalent percent of the diamine comprises ethylene diamine. Preferably, ETPEAs are resin composition further prepared by reacting in a manner so that (c) 10-60 equivalent percent of the total of the hydroxyl and amine equilvalents provided by diamine, polyol and monoalcohol are provided by monoalcohol; and/or (d) no more than 50 equivalent percent of the total of the hydroxyl and amine equivalents provided by diamine, polyol and monoalcohol are provided by polyol.

Further examples of ETPEAs are those that are resin compositions prepared by reacting together components comprising dibasic acid, diamine, polyol and mono-alcohol, wherein at least 50 equivalent percent of the dibasic acid comprises polymerized fatty acid; and at least 50 equivalent percent of the diamine comprises ethylene diamine; and (b) hydrocarbon. Further examples are those prepared in a manner so that 10-60 equivalent percent of the total of the hydroxyl and amine equivalents provided by diamine, polyol and monoalcohol are provided by monoalcohol and/or no more than 50 equivalent percent of the total of the hydroxyl and amine equivalents provided by diamine, polyol and monoalcohol are provided by polyol. In one aspect of making ETPEAs, some or all of the hydrocarbon may be substituted with polydimethylsiloxanes (PDMS) or other silicon-containing material (such as phenylated silicones such as phenyl trimethicones, phenyl dimethicones and phenyl trimethylsiloxy diphenylsiloxanes etc.).

Methods of making the above-mentioned ETPEA compositions may be found, for example, in U.S. Pat. No. 6,552,160, which is hereby incorporated, in its entirety, herein by reference.

Another preferred class of polyamide as the LTS is Poly-AlkyleneOxy-terminated PolyAmides (PAOPAs). PAOPAs are resin compositions containing at least one block copolymer of the formula: hydrocarbon-polyether-polyamide-polyether-hydrocarbon. Such composition that include this block copolymer, may also include one or more of a diacid, diamine or hydrocarbon-terminated polyether. In various aspects, the polyamide block includes blocks of the formula (3):

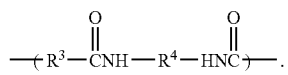

where $R^3$ is a hydrocarbon diradical, preferably dimer acid-derived, e.g., wherein the $R^3$ group includes a diradical that results when two carboxylic acid groups are removed from dimer acid; $R^4$ is selected from a hydrocarbon and a polyether diradical; the polyether block includes blocks of the formula (4): —(R2-O)—, where $R^2$ is a hydrocarbon; $C_{1-22}$ hydrocarbon radicals are located at either end of the copolymer, where the hydrocarbon radical may optionally be selected from alkyl, aralkyl, aryl, and alkaryl radicals.

In other aspects, the PAOPA may be a composition containing at least one copolymer that has the formula (5):

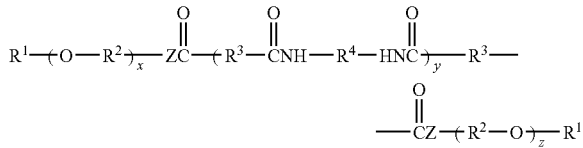

where independently at each occurrence, $R^1$ is selected from $C_{1-22}$ hydrocarbon radicals; $R^2$ is selected from $C_{2-6}$ hydrocarbon diradicals; $R^3$ is selected from $C_{2-52}$ hydrocarbon diradicals, where at least 50% of the $R^3$ diradicals have at least 34 carbons; $R^4$ is selected from $C_{2-36}$ hydrocarbon diradicals and $C_4$-$C_{100}$ polyether diradicals; Z is selected from O and NH; x is an integer from 2 to 100; y is an integer from 1 to 10.

In other aspects, the PAOPA may be a composition containing at least one copolymer that has the formula (6):

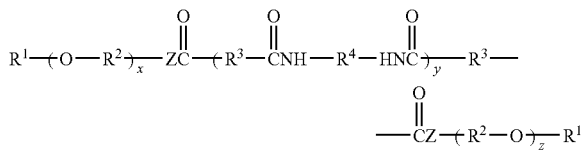

where, independently at each occurrence, $R^1$ is a $C_1$-$C_8$ hydrocarbon radical; $R^2$ is a $C_1$-$C_4$ hydrocarbon diradical; $R^3$ is a $C_1$-$C_{52}$ hydrocarbon diradical, where at least 50% of the $R^3$ diradicals are derived from dimer acid; $R^4$ is selected from $C_1$-$C_8$ hydrocarbon diradicals and polyether diradicals of the formula —$(R^{11}$—O$)_g$—$R^{11}$— wherein $R^{11}$ is a $C_1$-$C_6$ hydrocarbon diradical independently selected at each occurrence and g is an integer from 2 to 100; Z is selected from O and NH; x is an integer from 2 to 100; y is an integer equal to 1 or more that provides a copolymer molecular weight of 2,000 to 50,000, and z is an integer from 2 to 100.

In other aspects, the PAOPA may be a composition containing at least one copolymer that has the formula (7):

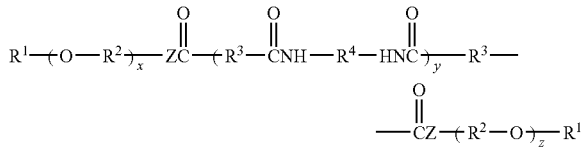

where
a) $R^1$ is $CH_3$; $R^2$ is a $C_2$-$C_4$ hydrocarbon diradical;
b) $R^3$ is derived entirely from dimer acid;
c) $R^4$ is selected from $C_2$-$C_6$ hydrocarbon diradicals and polyether diradicals of the formula: —$(R^{11}$—O$)_g$—$R^{11}$—, wherein $R^{11}$ is a $C_2$-$C_4$ hydrocarbon diradical (independently selected at each occurrence) and g is an integer from 4 to 50;
d) Z is —NH;
e) x and z are integers from 20 to 50; and
f) y is an integer that is >2, such that the copolymer weight average molecular weight is 2,000-25,000.

In various aspects, the PAOPA is a composition that includes a copolymer as described above, that meets one or more of the following criteria: an acid number of less than 25; an amine number of less than 5; a softening point of 50-150° C.; a weight average molecular weight of 2,000 to 20,000; a melting point above 50° C. and a viscosity at 160° C. of less than 5,000 cps.

Methods of making the above-mentioned PAOPAs compositions may be found, for example, in U.S. Pat. No. 6,399,713, which is hereby incorporated, in its entirety, herein by reference.

Another preferred class of polyamide as the LTS is Poly-Ether-PolyAmides (PEPAs). PEPAs are resin compositions having a softening point between 60° C. and 180° C. and formed from a reaction mixture of one or more diacid compound(s) containing 1,4-cyclohexane dicarboxylic acid (CHDA), and one or more diamine compound(s) containing poly(alkyleneoxy)diamine (PAODA), the reaction mixture containing some or no monofunctional compounds reactive with either amine and/or carboxylic acid groups. Further examples of PEPAs include, but are not limited to those having a softening point between 60° C. and 180° C. and formed from a reaction mixture containing one or more diacid compound(s) including polymerized fatty acid, and at least two diamine compound(s) including poly(alkyleneoxy)diamine (PAODA) and short-chain aliphatic diamine having 2-6 carbons (SDA), where a) the reaction mixture contains x grams of PAODA and y grams of SDA, and $x/(x+y)$ is 0.8-0.98; b) the reaction mixture weighs z grams, and $x/z$ is at least 0.25; and c) the reaction mixture contains either no co-diacid, or comprises a minor amount of co-diacid, wherein, if the reaction mixture comprises a minor amount of co-diacid, then acid equivalents from co-diacid contribute less than 25% of the total acid equivalents present in the reaction mixture.

Another PEPA composition is one that contains a polyamide-polyether block copolymer formed from a reaction mixture containing two or more diacid compounds containing 1,4-cyclohexane dicarboxylic acid (CHDA) and two or more diamine compounds containing poly(alkyleneoxy)diamine (PAODA), the reaction mixture further containing a monofunctional compound reactive with amine groups where the:
  a) copolymer has a softening point between 80° C. and 120° C.;
  b) CHDA provides at least 60% of the acid equivalents from diacid compounds; and
  c) PAODA provides at least 90% of the amine equivalents from diamine compounds.

Another PEPA composition is one that contains a polyamide-polyether block copolymer formed from a reaction mixture containing or two or more diacid compounds containing 1,4-cyclohexane dicarboxylic acid (CHDA) and two or more diamine compounds containing poly(alkyleneoxy)diamine (PAODA), the reaction mixture containing a monofunctional compound reactive with carboxylic acid groups where:
  a) the copolymer has a softening point between 80° C. and 120° C.;
  b) CHDA provides at least 60% of the acid equivalents from diacid compounds; and
  c) PAODA provides at least 90% of the amine equivalents from diamine compounds.

Another PEPA composition is one that contains a polyamide-polyether block copolymer having a softening point between 80° C. and 120° C. formed from a reaction mixture of polymerized fatty acid and two or more diamine compounds containing PAODA and a short-chain aliphatic diamine (SDA) having 2-6 carbons where:
  a) for a reaction mixture of x grams of PAODA and y grams of SDA, the ratio $x/(x+y)$ is 0.85-0.98; and
  b) for a reaction mixture weighing z grams, the ratio $x/z$ is >0.40.

Methods of making the above-mentioned PEPA compositions may be found, for example, in U.S. Pat. No. 6,956,099, which is hereby incorporated, in its entirety, herein by reference.

From 10 ppm to 80 wt % polyamide based on the total weight of the FAC:polyamide composition, including all ranges and subranges therein, may be added to the FAC. This may include at least 10, 20, 30, 40, 50, 60, 70, 80, 90, 100, 110, 120, 130, 140, 150, 175, 200, 225, 250, 300, 350, 400, 450, 500, 550, 600, 650, 700, 750, 1000, 2000, 3000, 4000, 5000, 6000, 7000, 8000, 9000, and 10000 ppm polyamide, including any and all ranges and subranges therein. Further, this may include at most 80, 75, 70, 65, 60, 65, 60, 55, 50, 49, 48, 47, 46, 45, 44, 43, 42, 41, 40, 35, 30, 25, 20, 15, 10, 9, 8, 7, 6, 5, 4, 3, 2, 1, 0.5, 0.1, 0.05, 0.01, 0.005, and 0.001 wt % polyamide, including any and all ranges and subranges therein.

Preferred polyamides are those polyamides commercially available from Arizona Chemical Company, most preferably Sylvaclear 2612, Sylvagel 5600, Sylvaclear 100, Sylvaclear 100LM, Sylvaclear C75v, Uniclear 100, and Uniclear 100v.

According to the present invention, the LTS is added to a fatty acid containing composition (FAC) so as to produce a blend, where the blend, also referred to herein as a mixture, has better low temperature stability than does the FAC. The low temperature stability of both the FAC and the blend may be determined by any of the following four simple laboratory tests, which are exemplary only. These include, for example, long-term storage, cloud point (CP), pour point (PP), and cold flow plugging point (CFPP).

Preferably, the LTS is added to the FAC so as to improve the cloud point thereof. Most preferably, the LTS:FAC composition has a cloud point that is enhanced by at least 1% as compared to that of the FAC alone. The cloud point is preferably enhanced at least 1, 2, 5, 10, 15, 20, 25, 30, 35, 40, 45, 50, 60, 70, 80, 90, 100, 200, 300, 500, and 1000% as compared to that of the FAC alone. The cloud point may be measured by in the following units: Farenheit, Celcius, and Kelvin.

Preferably, the LTS is added to the FAC so as to improve the pour point thereof. Most preferably, the LTS:FAC composition has a pour point that is enhanced by at least 1% as compared to that of the FAC alone. The pour point is preferably enhanced at least 1, 2, 5, 10, 15, 20, 25, 30, 35, 40, 45, 50, 60, 70, 80, 90, 100, 200, 300, 500, and 1000% as compared to that of the FAC alone.

Preferably, the LTS is added to the FAC so as to improve the CFPP thereof. Most preferably, the LTS:FAC composition has a CFPP that is enhanced by at least 1% as compared to that of the FAC alone. The CFPP is preferably enhanced at least 1, 2, 5, 10, 15, 20, 25, 30, 35, 40, 45, 50, 60, 70, 80, 90, 100, 200, 300, 500, and 1000% as compared to that of the FAC alone.

Preferably, the LTS is added to the FAC so as to improve the DSC event thereof. Most preferably, the LTS:FAC composition has a DSC event that is enhanced by at least 1% as compared to that of the FAC alone. The DSC event is preferably enhanced at least 1, 2, 5, 10, 15, 20, 25, 30, 35, 40, 45, 50, 60, 70, 80, 90, 100, 200, 300, 500, and 1000% as compared to that of the FAC alone.

Low temperature stability may be determined by measuring the cloud point of a sample. Determining the cloud point of a sample is a well-known technique, and is described in ASTM D2500/IP219/ISO3015 from American Society for Testing and Materials (West Conshohocken, Pa.; http://www.astm.org). Many vendors sell equipment specifically designed to measure cloud point according to this ASTM procedure. See, e.g., Herzog HCP 852 Pour & Cloud Point Analyzer from Walter Herzog GmbH (Lauda-Königshofen, Germany; a subsidiary of PAC Petroleum Analyzer Company L.P., Pasadena, Tex., USA; www.paclp.com); and CPP97-2A Version 2 Automatic Cloud and Pour Point Analyzer from GT Instruments (a division of Gecil Process; Saint-Cyr-au-Mont-d'Or, France; www.gecil.com). Essentially, the cloud point test cools a sample while monitoring for crystal formation. The cloud point is that temperature at which crystals begin to appear. A lower cloud point denotes better low temperature stability.

Low temperature stability may also be determined by monitoring the appearance of a cooled sample over an extended period of time. Thus, a sample is placed in a container, and the container is placed into a cooled environment. On a periodic basis, for example, daily, weekly, or biweekly, the samples are visually examined for clarity. Clarity may be judged on a scale of 1-10, where 1 is crystal clear and 10 is opaque. While this method does not provide unambiguous quantitative data, the method is quite satisfactory for monitoring the relative low temperature stability of several samples.

Differential scanning calorimetry (DSC) is another technique that may be used to determine low temperature stability. A sample may be subjected to the following heating and cooling regime: heat from 25° C. to 100° C. @ 50° C./min; then hold at 100° C. for 2 min; then cool from 100° C. to −50° C. @ 10° C./min; then hold at −50° C. for 2 min; then heat from −50° C. to 10° C. @ 20° C./min. The DSC device is used to measure exotherms and endotherms that occur during this heating and cooling regime. A sample that demonstrates a relatively lower temperature of crystallization will have better low temperature stability according to the present invention.

Other methods that may be used to measure the low temperature stability of a FAC or a mixture of FAC and LTS include, without limitation, the pour point of the material, where a lower pour point is indicative of better low temperature stability. The pour point generally indicates the lowest temperature at which the composition can be pumped. Pour point may be measured by, e.g., ASTM D2500/IP219/ISO3015). Another suitable technique is the Low Temperature Flow Test (LTFT). See, e.g., ASTM D4539 and Canadian General Standards Board CAN/CGSB-3.0-No. 140.1.

In one aspect of the invention, the mixture of FAC and the LTS has a lower cloud point than the FAC. In another aspect, the mixture of FAC and the LTS has a lower pour point than FAC. In another aspect, the LTFT shows superior low temperature stability for the mixture of FAC and LTS compared to FAC. In another aspect of the invention, the mixture of FAC and LTS demonstrates better low temperature stability that FAC according to any two of these tests.

According to the present invention, LTS is added to FAC in a sufficient amount to provide a mixture that has better low temperature stability than does the FAC alone.

The present invention may be used in lieu of, or in addition to, one or more other methods that can be employed to address the problem of unsatisfactory low temperature stability of fatty acids. Currently, the industry concerned about the low temperature stability of fatty acids most often turns to one exemplified solution that is focused on the use of heated FAC storage tanks, and/or the addition of solvent, typically hydrocarbon solvent, to the FAC, in order to address the problem of low temperature stability. Thus, according to the present invention, a mixture of FAC and LTS may be placed into a heatable storage tank, and the mixture heated to a sufficient temperature that the low temperature outside the storage tank, i.e., the ambient temperature, does not detrimentally affect the stability of the mixture within the tank. In this way, stability at lower than ambient temperatures may be achieved for the same amount of heating, and/or less heating may be employed in order to obtain the same amount of stability for a given ambient temperature.

The LTS and FAC may be contacted with each other via mixing, blending, etc. The contacting may occur while applying heat. The LTS is dissolved in the FAC at temperatures higher or lower than the melting and/or softening point of the LTS.

Likewise, some solvent may be added to the FAC, along with the BCFA/CFA, in order to either further enhance the low temperature stability of the mixture, or to require less BCFA/CFA in order to achieve the same low temperature stability. Suitable solvents for this purpose are well known and currently used in commercial settings. Some of these solvents are: aromatic hydrocarbons, non-aromatic cyclic hydrocarbons; hydrocarbons, branched hydrocarbons, saturated hydrocarbons. Specific solvents known by their chemical names include xylene, heptane, and kerosene. Specific solvents known by their commercial names include SHELLSOLT™ heptane and CYCLO SOLT™ 100 Aromatic solvent (both from Shell Chemical Company, Houston, Tex. USA; www.shellchemicals.com); SOLVESSO™ 100 and 150, which are but two suitable "Aromatic Fluids" sold by ExxonMobil Chemical (Houston, Tex., USA; www.exxonmobil.com/chemical); and Caromax™ products such as Caromax™ 20 sold by Petrochem Carless. Preferably, the solvent contains a majority of xylene, most preferably 100 wt % xylene, when it is used according to the present invention.

Still likewise, a cosolvent may be added to the FAC. Examples of the cosolvent include alcohol containing cosolvents, especially in the case when the LTS is a polyamide, more especially when the FAC contain esters of fatty acids and the LTS is a polyamide. The most preferred alcohol containing cosolvents are low molecular weight alcohols, including but not limited to those alcohols having the following formula: $R^3OH$, where $R^3$ a hydrocarbon containing from 1 to 20 carbon atoms. The hydrocarbon may contain 1, 2, 3, 4, 5, 6, 7, 8, 9, 10, 11, 12, 13, 14, 15, 16, 17, 18, 19, and 20 carbon atoms and may be or branched. Preferably, the cosolvent is ethanol and/or 2-ethyl hexanol. The cosolvent may be used in addition to or in lieu of the solvent described above.

The LTS may be added to the solvent or cosolvent prior to, after, and/or at the same time as it is contacted with the FAC.

In one embodiment, the LTS may be added to the solvent and/or cosolvent prior to contacting the LTS with the FAC. In such an embodiment, the LTS may or may not be heated during such addition. The temperature during the addition may be higher or lower than the melting point or softening point of the LTS. The solvent or cosolvent may be added to the LTS so that the resultant mixture contains the LTS at an amount of from 10 to 70 wt %, preferably from 40 to 60 wt %, most preferably from 45 to 55 wt %, based upon the total weight of the mixture. The LTS may be present at an amount that is 10, 15, 20, 25, 30, 31, 32, 33, 34, 35, 40, 45, 50, 55, 60, 65, 66, 67, 68, 69, and 70 wt %, based upon the total weight of the mixture, including any and all ranges and subranges therein. In this embodiment, the LTS:FAC mixture and/or blend may then be contacted with the cosolvent and/or solvent. Alternatively, additional FAC may be added thereto the LTS:FAC mixture/blend so that the resultant LTS:FAC mixture/blend contains the LTS at an amount of from 0.1 wt % to 10 wt %, preferably from 1 to 9 wt %, most preferably from 2 to 7 wt %, based upon the total weight of the mixture. The LTS may be present in an amount that is 0.1, 0.2, 0.5, 1, 2, 3, 4, 5, 6, 7, 8, 7, 8, and 9 wt % based upon the total weight of the mixture, including any and all ranges and subranges therein. Further in this embodiment, the LTS:FAC mixture/blend may be contacted with the solvent and/or cosolvent in a manner so that the LTS is present in the resultant mixture/blend at an amount that is from 0.01 to less than about 10 wt %, preferably from 0.05 to 8 wt %, more preferably from 0.2 to 5 wt %, most preferably from 0.5 to 5 wt %, based upon the total weight of the mixture. The LTS may be present in an amount that is 0.01, 0.02, 0.05, 0.1, 0.5, 1, 2, 3, 4, 5, 6, 7, 8, 7, 8, and 9 wt % based upon the total weight of the mixture, including any and all ranges and subranges therein.

In another embodiment, the solvent and/or cosolvent may be added to the LTS after the LTS is contacted with the FAC, so long as the LTS and FAC are present in the above-mentioned amounts that are necessary to improve the low temperature properties of the FAC.

In another embodiment, the solvent and/or cosolvent and/or the LTS may be contacted with the FAC simultaneously so long as the LTS and FAC are present in the above-mentioned amounts that are necessary to improve the low temperature properties of the FAC.

Of course, heated storage tanks, along with the use of both solvent and/or cosolvent and LTS, may be used to enhance low temperature stability. Furthermore, heated storage tanks and the addition of solvent are but two methods that are reportedly used to enhance low temperature stability of FAC; the addition of LTS to FAC may be used with any one or more other methods to enhance low temperature stability of fatty acids. One of these other methods is disclosed in PCT International publication No. WO 01/38461, wherein the addition of flow improvers to fatty acid is reportedly useful in improving the low temperature operability of fatty acids and which is hereby incorporated, in its entirety, herein by reference.

In an additional embodiment when the LTS is BCFA and/or CFA, the mixture of FAC and LTS according to the present invention may be employed in most any application where FAC is currently employed. A significant advantage of the present invention is that the mixture of FAC and LTS according to the present invention is almost chemically and physically indistinct from FAC itself or LTS provides a functionally superior composition for end-product performance. Thus, as a practical matter, the mixture of FAC and LTS performs chemically and physically just like FAC itself or the LTS:FAC composition is functionally superior to the FAC itself. This is particularly true when the LTS has the same acid number as the FAC. Accordingly, in one aspect of the invention, the LTS has an acid number within +/−25% of the acid number of the FAC, and preferably has an acid number within +/−20%, or 15%, or 10%, or 5%, or 3%, or 1% of the FAC. Techniques to measure acid numbers are well known in the art and will not be described here. See, e.g., ASTM D-465 (1982).

The mixture of FAC and LTS according to the present invention may be used as a fuel additive and/or a fuel blend component, for instance, as a lubricity improver and/or as a fatty acid alkyl ester containing fuel. In an embodiment of the present invention, when the FAC contains a fatty acid alkyl ester, such as for example a fatty acid methyl ester, the FAC may be the fuel, preferably a biofuel. Suitable fuels which may advantageously be combined with the FAC/LTS mixture of the invention include, without limitation, middle distillates, diesel, gas oil, gasoline, aviation fuel, biofuel and kerosene. The fuel may also be a low sulphur fuel and/or an ultra low sulfur fuel. The fuel may have a sulfur content, i.e., <500 ppm or <350 ppm or <50 ppm or <15 ppm or <10 ppm, based upon the total weight of the composition before and/or after the LTS is added thereto. Further, the fuel may also be sulfur free or essentially sulfur free containing no sulfur and/or trace amounts of sulfur.

The FAC/LTS blend may either be added directly to the fuel, or it may form part of a fuel additive package, where such packages are common in the fuel additive industry. The FAC/LTS mixture and/or blend may include the above-mentioned solvent and/or cosolvent prior to its addition to the fuel and/or fuel additive package. Other components that may be present in the fuel additive package are one or more of detergent, cold flow additive, antifoam, static dissipator, antioxidant, and others additives as used in the art.

In a preferred embodiment, about 20 parts per million (ppm) to 99 wt % of the FAC/LTS mixture in the fuel may be necessary, based upon the total weight of the composition, especially when the LTS is a polyamide. In fact, when the FAC may be used as a fuel itself, the FAC/LTS mixture may be 100 wt %, based upon the total weight of the composition. In one embodiment, about 20 ppm to 20 wt % of the FAC/LTS mixture in the fuel may be necessary, based upon the total weight of the composition. The amount of the FAC/LTS may vary and is dependent upon the function of the FAC in the fuel. For example, about 20 to 1000 ppm of the FAC/LTS mixture is preferable in instances where the FAC is utilized to afford improved lubricity to the fuel.

In various aspects, the present invention provides a method of improving the performance of a fuel by adding to that fuel a performance-enhancing amount of a mixture of FAC and LTS, where the mixture has better low temperature stability than does the FAC. In another embodiment, the present invention provides a fuel having both FAC and LTS, where the combination of FAC and LTS is present at a concentration of about 50 ppm to about 20 wt % based on the total weight of the composition. In another aspect, the present invention provides a fuel prepared by the process of combining fuel, FAC and LTS, where these three components are combined in any order, and the FAC and LTS are, in total, present in the fuel at a concentration effective to enhance the performance of the fuel, preferably from 50 ppm to about 20 wt % based on the total weight of the composition.

In any embodiment where the fuel, LTS and FAC are present in a single composition, the combined amount of FAC and LTS is present at an amount that is at least 20 ppm, 30 ppm, 40 ppm, 50 ppm, 60 ppm, 70 ppm, 80 ppm, 90 ppm, 100 ppm, 110 ppm, 120 ppm, 130 ppm, 140 ppm, 150 ppm, 175 ppm, 200 ppm, 225 ppm, 250 ppm, 300 ppm, 400 ppm, and 500 ppm, and present at an amount that is equal to or less than 100, 90, 80, 70, 60, 55, 50, 45, 40, 35, 30, 25, 20, 19, 18, 17, 16, 15, 10, 5, 4, 3, 2, 1, 0.5, 0.1, 0.05, and 0.01 wt % based upon the total weight of the composition. In each of these fuels or methods to prepare a fuel, in preferred aspects of the invention, the weight ratio of LTS to FAC in the fuel may be 1:1; 0.8:1; 0.6:1; 0.4:1; 0.2:1 0.1:1; 0.09:1; 0.08:1; 0.07:1; 0.06:1; 0.05:1; 0.04:1; 0.03:1; 0.02:1; 0.01:1; 0.008:1; 0.006:1; 0.004:1; 0.002:1; 0.001:1; and 0.0001:1 of LTS:FAC.

In one embodiment of the present invention, the FAC composition is a fuel itself, a lubricity improver, friction modifier, a fuel additive package, and/or mixtures thereof. For example, when at least a portion of the FAC is fatty acid alkyl ester, for example a fatty acid methyl ester, and the LTS is, for example a polyamide and is added directly or indirectly thereto the FAC, the resultant composition may be used directly as a fuel, for example as a biofuel. In another example, when at least a portion of the FAC is for example a monoglycerol TOFA ester and the LTS is added directly or indirectly thereto, the resultant composition may be used directly as a fuel additive. In an additional example, when at least a portion of the FAC is a TOFA-based triglyceride and the LTS is added directly or indirectly thereto, the resultant composition may be used directly as a fuel. Of course, other fuel additives and/or solvents and/or cosolvents may be a part of the above-mentioned compositions.

The FAC:LTS composition of the present invention may be incorporated into additive packages specifically tailored to the end use and/or function. When such packages are intended to be utilized for use in fuels, especially diesel fuels, such packages may include solvents, biocides, detergents, corrosive inhibitors, cetane improvers, dyes, and antistatics. Preferably, packages are constructed with low sulfur-containing constituents, including, for example, those described in WO 2005/078052, which is hereby incorporated, in its entirety, herein by reference. Further examples of fuels and additives known to be packaged and utilized in such fuels are summarized and exemplified in the following Table.

| | | | Detergents | Dispersant | Carrier Fluids | Combustion Improver | Cetane Improver | Octane Improver | Ethers | Smoke Suppressants |
|---|---|---|---|---|---|---|---|---|---|---|
| Major Blend Components | Spark Ignition | Gasoline, Petrol, Petroleum Ethers | x | x | x | x | | x | x | x |
| | Compression Ignition | Diesel, Gas Oils, Middle Distillates | x | x | x | x | x | | x | x |
| | Aviation Fuel | Jet Fuel, Kerosene | | | | | | | x | |
| | Heavy Fuel | Heating Oil, Bunker Fuel, Marine Fuel, Asphaltenes | x | x | | x | | | | x |
| | Synthetic Fuels | Biomass to Liquid BtL, Gas to Liquids GtL, Fischer Tropsch Fuel, | x | x | x | x | x | x | x | x |
| Minor Blend Components | Oxygenates | MTBE, ETBE, TAME, TAEE | x | | x | x | | | | x |
| | Bio-fuels Alcohols | Ethanol, Methanol, Butanol, Alkyl c1-8 | x | x | x | x | | | x | x |
| | Esters | FAME, FAEE, Triglycerides, Vegetable Oils | x | x | | x | | | | x |
| Special | Gaseous Fuels | LPG, CNG, DME, Hydrogen | | | | | | | | |

| | | | Particulate Filter Regeneration Additives | Exhaust After Treatment Additive | ColdFlow Improver CP/PP/CFPP | Wax Anti-Settling Additive WASA | Viscosity Modifier | Icing Inhibitors | Corrosion Inhibitors | Lubricity Improver |
|---|---|---|---|---|---|---|---|---|---|---|
| Major Blend Components | Spark Ignition | Gasoline, Petrol, Petroleum Ethers | | | x | | | | x | |
| | Compression Ignition | Diesel, Gas Oils, Middle Distillates | x | x | x | x | | | x | x |
| | Aviation Fuel | Jet Fuel, Kerosene | | | | | | x | x | x |
| | Heavy Fuel | Heating Oil, Bunker Fuel, Marine Fuel, Asphaltenes | x | x | x | x | x | | x | |
| | Synthetic Fuels | Biomass to Liquid BtL, Gas to Liquids GtL, Fischer Tropsch Fuel, | x | x | x | x | x | | x | x |

-continued

| | | | | | | | | | | |
|---|---|---|---|---|---|---|---|---|---|---|
| Minor Blend Components | Oxygenates Bio-fuels | MTBE, ETBE, TAME, TAEE | | | | | | | x | x |
| | Alcohols | Ethanol, Methanol, Butanol, Alkyl c1-8 | | | | x | | | x | x |
| | Esters | FAME, FAEE, Triglycerides, Vegetable Oils | x | x | x | x | x | | x | |
| Special | Gaseous Fuels | LPG, CNG, DME, Hydrogen | | | | | | | | |

| | | | Friction Modifiers | Dehaze | Demulsifier | Antifoam | Static Dissipators | Metal Deactivators | Thermal Stabilisers | Antioxidants |
|---|---|---|---|---|---|---|---|---|---|---|
| Major Blend Components | Spark Ignition | Gasoline, Petrol, Petroleum Ethers | x | x | x | | x | x | | x |
| | Compression Ignition | Diesel, Gas Oils, Middle Distillates | x | x | x | x | x | x | | x |
| | Aviation Fuel | Jet Fuel, Kerosene | | | x | | x | x | x | x |
| | Heavy Fuel | Heating Oil, Bunker Fuel, Marine Fuel, Asphaltenes | | x | x | | | x | x | x |
| | Synthetic Fuels | Biomass to Liquid BtL, Gas to Liquids GtL, Fischer Tropsch Fuel, | x | x | x | x | x | | x | x |
| Minor Blend Components | Oxygenates Bio-fuels | MTBE, ETBE, TAME, TAEE | | x | | x | | | | |
| | Alcohols | Ethanol, Methanol, Butanol, Alkyl c1-8 | x | x | x | x | x | x | x | x |
| | Esters | FAME, FAEE, Triglycerides, Vegetable Oils | x | x | x | x | x | x | x | x |
| Special | Gaseous Fuels | LPG, CNG, DME, Hydrogen | | | | | | | | |

| | | | Biocides | Dyes | Markers | Reodourants | Compatibilisers | Surfactants | Solvent | Lead Replacement Additives |
|---|---|---|---|---|---|---|---|---|---|---|
| Major Blend Components | Spark Ignition | Gasoline, Petrol, Petroleum Ethers | x | x | x | x | | x | | x |
| | Compression Ignition | Diesel, Gas Oils, Middle Distillates | x | x | x | x | | x | | |
| | Aviation Fuel | Jet Fuel, Kerosene | | | | | | | | |
| | Heavy Fuel | Heating Oil, Bunker Fuel, Marine Fuel, Asphaltenes | x | | x | | x | x | | |
| | Synthetic | Biomass to Liquid | x | x | x | x | x | x | | x |

-continued

| | | | | | | | | | | |
|---|---|---|---|---|---|---|---|---|---|---|
| Minor Blend Components | Fuels | BtL, Gas to Liquids GtL, Fischer Tropsch Fuel, | | | | | | | | |
| | Oxygenates | MTBE, ETBE, TAME, TAEE | | | | | x | | | |
| | Bio-fuels Alcohols | Ethanol, Methanol, Butanol, Alkyl c1-8 | x | x | x | x | x | x | | x |
| | Esters | FAME, FAEE, Triglycerides, Vegetable Oils | x | x | x | x | x | x | | |
| Special | Gaseous Fuels | LPG, CNG, DME, Hydrogen | | | | | | | | |

In addition to its use as a fuel additive, the mixture of FAC and LTS according to the present invention may be employed in most any application where FAC is currently employed.

The following examples are provided by way of illustration and not limitation. In Tables 1-4, TOFA 1 and TOFA 2 are typical tall oil fatty acid available from European distillers; BCFA 1 is a mixture of fatty acids having iso-stearic acid as the major component; and BCFA 2 is a mixture of fatty acids having iso-oleic acid as the major component.

The present invention is explained in more detail with the aid of the following embodiment example which is not intended to limit the scope of the present invention in any manner.

EXAMPLES

Example 1

The preferred polyamides can be dissolved in the fatty acid using heating and stirring if necessary. The actual dissolving can take place below the softening/melting point of the polyamide. After the polyamide is dissolved additional solvent can be added to achieve the desired cloud point or viscosity. The addition of solvent can take place at elevated temperatures, but at least above the cloud point temperature of the neat fatty acid to avoid crystallization.

Alternatively, the fatty acid, polyamide and solvent can be mixed together in the desired concentrations and heated and the mixture stirred until the polyamide is dissolved.

The following data are examples to show the working principles. They are not optimized to achieve the maximum effects nor are they extensive lists of all possible combinations. The error margin for the cloud point measurements is +/−2 C.

In Table 1 the cloud points in degrees Celsius are given for the fatty acid Sylfat 2LT with a polyamide to show the effect of different concentrations. The mixtures were prepared by the procedure described in example 1. In Table 1 it can be seen that the cloud point of Sylfat 2LT can be reduced from −8 C to about −17 or −18 C by increasing the concentration of Uniclear 100. Depending on the type of polyamide this maximum effect is reached by the addition of 3 to 6% for example for Uniclear 100, Sylvagel 8100 and Sylvagel 5000.

TABLE 1

Influence of polyamide concentration on neat TOFA (Sylfat 2LT) cloud points

| Sylfat 2LT | Cloud points |
|---|---|
| no additives | −6 |
| Uniclear 100 2% | −13 |
| Uniclear 100 3% | −17 |
| Uniclear 100 5% | −18 |
| Uniclear 100 10% | −17 |

In Table 2 other polyamides with Sylfat 2LT are shown tested at 5%. This gives a good indication of the effectiveness of the selected polyimide to lower the cloud points of Sylfat 2LT.

TABLE 2

Influence of polyamide type on neat TOFA cloud points at 5% addition level

| Sylfat 2LT | Cloud points |
|---|---|
| Uniclear 100 | −18 |
| Sylvagel 6100 | −17 |
| Sylvaclear 100LM | −15 |
| Sylvagel 5000 | −17 |
| Sylvaclear A200 | −15 |
| Sylvaclear A2612 | −16 |
| Sylvaclear A200LM | −10 |

It was found that not all polyamides are effective as cloud point suppressants as is shown in Table 3. For example UR2532 forms a firm solid non-transparent gel after preparation at elevated temperatures and cooling down to room temperature. Some other polyamides also showed cloud points which are higher than the cloud point of neat Sylfat 2LT. For example, UR 5803 and UR 128.

TABLE 3

Effect of alternative polyamide chemistry on neat TOFA cloud points at 5% addition level

| Sylfat2LT | Cloud points |
|---|---|
| UR 2540 | −13 |
| UR 2530 | −12 |

TABLE 3-continued

Effect of alternative polyamide chemistry on
neat TOFA cloud points at 5% addition level

| Sylfat2LT | Cloud points |
|---|---|
| UR 2532 | gelled/opaque |
| UR 106/1 | −8 |
| UR 119 | −7 |
| UR 147 | −7 |
| UR 5803 | −3 |
| UR 126 | −2 |
| UR 141 | −6 |

For an alternative fatty acid. Sylvatal 25/30S (DTO), the cloud point can be decreased from +17 C to about −5 C, by adding 5% Uniclear 100. As for neat Sylfat 2LT the obtained cloud point depends both on the polyamide and concentration of added polyamide. This can be seen in Table 4 as example for a 5% addition level.

TABLE 4

Effect of polyamides on neat Sylvatal 25/30S
(DTO) cloud points at 5% addition level

| DTO Sylvatal 25/30S | Cloud point |
|---|---|
| no additives | 17 |
| Uniclear 100 5% | −5 |
| Sylvagel 6100 5% | −2 |
| Sylvaclear 100LM 5% | 7 |
| Sylvagel 5000 5% | 9 |
| Sylvaclear A200 5% | 10 |
| Sylvaclear A2612 5% | 11 |
| Sylvaclear A200LM 5% | 15 |
| UR2540 5% | 8 |

In Table 5 the well known effect of the addition of solvents to Sylfat 2LT is shown. Addition or 20% solvent (Xylene) lowers the cloud point to −14 C. whereas addition of 50% solvent Xylene or Shellsol A100 lowers the cloud point even further to −20 C.

TABLE 5

Addition of Solvents

| | | Cloud points |
|---|---|---|
| 100% Sylfat 2LT | | −6 |
| 80% Sylfat 2LT | 20% Xylene | −14 |
| 50% Sylfat 2LT | 50% Xylene | −20 |
| 50% Sylfat 2LT | 50% Shellsol A100 | −20 |

In Table 6 the joint effect of solvents and selected polyamides on TOFA cloud points are shown. For TOFA with 20% Xylene the addition of 1.8% Uniclear 100 lowers the cloud point further from −14 C to −23 C. Higher concentrations of Uniclear 100 have not been tested. The effect of adding solvent and polyamides is increased at higher concentrations of solvents. The addition of only 1% Uniclear 100 to 50% Shellsol A100 gives a decrease from −20 C to about −38 C. In the Table it is also shown that the same effect can be observed for alternative solvents such as Xylene and Terpene 405 and a polyamide, Sylvaclear 100LM.

TABLE 6

Addition of Solvent and Polyamide

| | | | Cloud points |
|---|---|---|---|
| 79.6% Sylfat 2LT | 20% Xylene | 0.4% UC 100 | −18 |
| 79.2% Sylfat 2LT | 20% Xylene | 0.8% UC 100 | −20 |
| 78.4% Sylfat 2LT | 20% Xylene | 1.6% UC 100 | −23 |
| 49% Sylfat 2LT | 50% Shellsol A100 | 1.0% UC 100 | −38 |
| 48% Sylfat 2LT | 50% Xylene | 2.0% SC 100LM | −41 |
| 48% Sylfat 2LT | 50% Shellsol A100 | 2.0% SC 100LM | −39 |
| 48% Sylfat 2LT | 50% Terpene 405 | 2.0% SC 100LM | −35 |

In Table 7 the cloud point of some different fatty acids and mixtures thereof are presented. For these fatty acids, Oleic acid. Nouracid 1885 and BKS (non-limited) the addition of selected polyamides improve the cloud point temperature.

TABLE 7

Other fatty acids

| | | | Cloud points |
|---|---|---|---|
| 100% Oleic acid | | | 13 |
| 50% Oleic acid | 50% Xylene | | −14 |
| 49% Oleic acid | 50% Xylene | 1.0% UC 100 | −22 |
| 50% Nouracid 1885 | 50% Xylene | | 2 |
| 48.9% Nouracid 1885 | 50% Xylene | 1.0% UC 100 | −6 |
| 100% BKS | | | 8 |
| 98% BKS | | 2% SC 100LM | 3 |
| 48% BKS | 50% Xylene | 2% SC 100LM | −30 |

1. Stability of mixture Composition

| Xylene | Sylvat 2LT | Polyamide | Storage stability 45 days @ −32° C. |
|---|---|---|---|
| 50 | 48 | 2.0 Sylvaclear 100LM | Clear and bright |
| 50 | 48.5 | 1.5 Sylvaclear 100LM | Clear and bright |
| 50 | 48 | 2.0 Sylvaclear CV75 | Clear and bright |

Example 2

Long-Term Low-Temperature Storage Stability

Five samples were prepared having the compositions set forth in Table 9. Each sample was stored at 0° C. and visually inspected (at 0° C.) every 7 days for 28 days. Visual inspection subjectively judged the clarity of the sample, on a scale of 0-10, where 0 denotes a clear and bright sample, and 10 denotes a solid, opaque sample; so that lower numbers are more desirable. A sample typically develops opacity due to the precipitation of one or more components from the sample. Therefore, as clarity decreases, the solids content of the sample tends to increase. This experiment was repeated, with the results shown in Table 10.

TABLE 9

CLARITY OF SAMPLES STORED AT 0° C. FOR 28 DAYS

| | Days | | | |
|---|---|---|---|---|
| Sample | 7 | 14 | 21 | 28 |
| TOFA 1 (a) | 4 | 5 | 7 | 7 |
| BCFA 1 (b) | 4 | 4 | 7 | 6 |
| BCFA 2 (c) | 8 | 8 | 8 | 8 |

TABLE 9-continued

CLARITY OF SAMPLES STORED AT 0° C. FOR 28 DAYS

| Sample | Days | | | |
|---|---|---|---|---|
| | 7 | 14 | 21 | 28 |
| 95% (a) + 5% (b) (wt %) | 2 | 3 | 3 | 3 |
| 95% (a) + 5% (c) (wt %) | 2 | 2 | 3 | 3 |

TABLE 10

CLARITY OF SAMPLES STORED AT 0° C. FOR 28 DAYS

| Sample | Days | | | |
|---|---|---|---|---|
| | 7 | 14 | 21 | 28 |
| TOFA 1 (a) | 2 | 4 | 4 | 4 |
| BCFA 1 (b) | 4 | 4 | 7 | 6 |
| BCFA 2 (c) | 8 | 8 | 8 | 8 |
| 95% (a) + 5% (b) (wt %) | 1 | 1 | 1 | 2 |
| 95% (a) + 5% (c) (wt %) | 3 | 2 | 2 | 2 |

The data in Tables 9 and 10 demonstrate that a mixture containing 95% tall oil fatty acid (TOFA) and 5% of a branched chain fatty acid (BCFA) demonstrates superior low temperature stability compared to either TOFA or BCFA alone.

Example 3

Cloud Point

Five samples were prepared having the compositions set forth in Table 11. The cloud point of each of these samples was measured using an automatic cloud point tester (Herzog HCP852 Cloud and Pour Point tester) carried out in accordance with ASTM D2500/IP219/ISO3015, where the cloud point of each sample is also shown in Table 11.

TABLE 11

CLOUD POINTS

| Sample | Cloud Point (° C.) |
|---|---|
| TOFA 1 (a) | −8 |
| BCFA 1 (b) | 0 |
| BCFA 2 (c) | −2 |
| 95% (a) + 5% (b) (wt %) | −10 |
| 95% (a) + 5% (c) (wt %) | −9 |

The data demonstrate that the combinations of fatty acids and branched chain fatty acids have a lower cloud point, i.e., will remain stable at lower temperatures for longer times, than either the fatty acids or the branched chain fatty acids alone.

Example 4

DSC Evaluations

Eight samples were prepared having the compositions set forth in Table 12. Each of these samples was examined by differential scanning calorimetry (DSC) while subjected to the following temperature profile: heat from 25° C. to 100° C. @ 50° C./min; then hold at 100° C. for 2 min; then cool from 100° C. to −50° C. @ 10° C./min; then hold at −50° C. for 2 min; then heat from −50° C. to 10° C. @ 20° C./min. In Table 12, "DSC Event" denotes the temperature at which a thermal transition is observed.

TABLE 12

DSC DATA

| Sample | DSC Event (° C.) |
|---|---|
| TOFA 1 (a) | −15 |
| TOFA 2 (b) | −16 |
| BCFA 1 (c) | −10 |
| BCFA 2 (d) | −12 |
| 95% (a) + 5% (c) (wt %) | −20 |
| 95% (a) + 5% (d) (wt %) | −19 |
| 95% (b) + 5% (c) (wt %) | −18 |
| 95% (b) + 5% (d) (wt %) | −20 |

The DSC data demonstrate that mixtures of tall oil fatty acid (TOFA) and branched chain fatty acids (BCFA) crystallize at lower temperature than does either of the components individually. This data provides evidence for the superior low temperature stability of the mixtures, compared to either TOFA or BCFA alone.

Example 5

The data below represent cold-flow properties of FAME as measured by Pour Point (PP), Cloud Point (CP), and Cold Flow Filter Plugging Point (CFPP). The error margin for these measurements is +/−2° C. in addition, Differential Scanning Calorimetry (DSC) has been employed to study crystallization behavior.

In the data shown below, all mixtures were prepared using the procedure described above.

Table 13 shows the influence of polyamide concentration on the PP of rapeseed FAME (RME). The PP of RME without additive is −12° C.

In the concentration range of 200-5000 ppm the PP is improved to −17° C. or lower.

In the concentration range of 400-3000 ppm the PP is improved to −34° C. or lower.

In the concentration range of 400-2000 ppm the PP is improved to −36° C. or lower.

At a concentration of 500 ppm the PP is improved to −38° C.

Table 13 shows that the PP of FAME is improved by polyamide addition at low concentrations. The PP is the temperature where FAME does no longer flow freely, and therefore the polyamide addition results in a system that is free flowing at lower temperature.

TABLE 13

Influence of Polyamide concentration PP of RME

| Additive type | Concentration (ppm) | Pour Point (° C.) |
|---|---|---|
| None | 0 | −12 |
| Sylvaclear A2612 | 200 | −17 |
| " | 300 | −18 |
| " | 400 | −36 |
| " | 500 | −38 |
| " | 1000 | −36 |
| " | 2000 | −36 |
| " | 3000 | −34 |
| " | 5000 | −18 |

Table 14 shows the influence of polyamide composition on the PP or RME at concentrations of 500 and 1000 ppm. The polyamides listed all are based on fatty acid dimer, EDA, and are terminated with fatty alcohols, fatty acids, or alkylamines. All compositions listed in table 11 improve the PP to −15° C. or lower.

Table 14 shows clearly that the type of polyamide influences the PP of FAME, to the extent that different polyamides result in a variation in their ability to suppress the PP.

TABLE 14

Influence of Polyamide composition on PP of RME, at concentrations of 500 and 1000 ppm

| | Pour Point (° C.) | |
|---|---|---|
| Additive type | 500 ppm | 1000 ppm |
| None | −12 | −12 |
| Sylvaclear A2612 | −38 | −36 |
| Sylvaclear A2612-U18 | −36 | −36 |
| Sylvaclear A200 | −36 | −36 |
| Sylvaclear 100LM | −15 | |
| Sylvaclear C75V | −15 | |
| Sylvaclear 10LW | −18 | −38 |
| UniRez 2540 | | |
| UniRez 2523 | | |
| Sylvaclear A2635 | | |

Table 15 compares the effect of polyamides on different types of FAME, vegetable oil, and diesel, at a polyamide concentration of 500 ppm The PP of RME without additives is −12° C.

The PP of Uniflex 300E without additives is −24° C.

Compositions listed in table 15 lower the PP of RME from −12° C. to −38° C. or lower Compositions listed in table 15 lower the PP of TOFA-FAME (Uniflex 300E) from −24° C. to below −51° C.

Table 15 shows clearly that polyamides are effective in improving the PP of FAME of different origin.

TABLE 15

Influence of Polyamides on the PP of FAME of different composition, at a polyamide concentration of 500 ppm/2000 ppm

| | Additive type | |
|---|---|---|
| FAME | None | Sylvaclear A2612 |
| Rapeseed (RME) | −12 | −38 |
| TOFA (Uniflex 300E) | −24 | <−51° C.* |
| Soybean (SME) | 0 | −4 |
| Used cooking oil (UCO) | 4 | |

*PP is below detection limit of −51° C.

Table 16 shows the influence of polyamide concentration on the CP of rapeseed FAME (RME). The CP of RME without additive is −3° C.

In the concentration range of 200-5000 ppm the CP is improved to −4° C. or lower.

In the concentration range of 500-5000 ppm the CP is improved to −6° C. or lower.

At a concentration of 5000 ppm the CP is improved to −8° C.

Table 16 shows the onset of crystallization as measured by the CP, is improved when polyamides are added to RME, the extent of the improvement depending on the concentration of the polyamide.

TABLE 16

Influence of Polyamide concentration on the CP of RME

| Additive type | Concentration (ppm) | Cloud Point (° C.) |
|---|---|---|
| None | 0 | −3 |
| Sylvaclear A2612 | 200 | −4 |
| " | 500 | −6 |
| " | 1000 | −6 |
| " | 5000 | −8 |

Table 17 shows the effect of polyamides on the Cloud Point (CP) of RME

The CP of RME without additives is −3° C.

Compositions listed in table 17 result in a CP varying from −6° C. to −9° C.

Table 17 shows that the influence on the CP varies with polyamide composition.

TABLE 17

Influence of Polyamide composition on CP of RME, at concentrations of 500 ppm and 5000 ppm

| | Pour Point (° C.) | |
|---|---|---|
| Additive type | 500 ppm | 5000 ppm |
| None | −3 | −3 |
| Sylvaclear A2612 | −6 | −8 |
| Sylvaclear A2612-U18 | | |
| Sylvaclear A200 | | |
| Sylvaclear 100LM | −5 | |
| Sylvaclear C75V | −7 | −8 |
| Sylvaclear LW10 | | |
| UniRez 2540 | −7 | |
| UniRez 2523 | −9 | |
| Sylvaclear A2635 | | |

Table 18 shows the influence of polyamide concentration on the CFPP of rapeseed FAME (RME). The CFPP of RME without additive is −5° C.

In the concentration range of 200-1000 ppm the CFPP is improved to −7° C. or lower.

At concentrations of 500 and 1000 ppm the CP is improved to −8° C.

The CFPP generally represents an intermediate state between initial crystallization (as measured by the CP) and full crystallization (as measured by the PP). Table 18 shows that the CFPP may be shifted to lower temperatures by the use of polyamides.

TABLE 18

Influence of Polyamide concentration on the CFPP of RME

| Additive type | Concentration (ppm) | CFPP (° C.) |
|---|---|---|
| None | 0 | −3 |
| Sylvaclear A2612 | 200 | −4 |
| " | 500 | −6 |
| " | 1000 | −6 |
| " | 5000 | −8 |

DSC Analysis

DSC (See FIG. 1) shows the influence of polyamide compositions on the thermal behaviour of the saturated fraction of TOFA-FAME. It can be seen that addition of polyamides of the invention shifts the onset of crystallization as measured using DSC. In addition, the crystallization process is altered such that the temperature range of crystallization is greatly extended. Further, full crystallization of the saturated fraction is suppressed from approximately −30° C. to approximately −40° C.

Thermal behaviour of TOFA FAME as measured by DSC. Depicted are the effects of polyamide compositions, as detailed below (from top in FIG. 1):

500 ppm Sylvaclear 100LM in TOFA-FAME
5000 ppm Sylvaclear 100LM in TOFA-FAME
500 ppm Sylvaclear A2612 in TOFA-FAME
Unadditized TOFA-FAME
5000 ppm Sylvaclear A2612 in TOFA-FAME
5000 ppm Sylvaclear A2612 in TOFA-FAME.

The improvement in low temperature properties of TOFA has become possible with the recent development of some new types of polyamide resins (4) based upon dimerised fatty acid which are designed to interact with fatty acids. This interaction can be controlled to improve the low temperature performance of the fatty acids.

The improvement in the low temperature properties can be demonstrated by adding the polyamide resin, eg Uniclear® 100, to a TOFA applying heat and stirring to dissolve the fatty acid and then allowing the mixture to cool. The resultant mixture has a significant lower cloud point than the TOFA alone as the results in Table 19 demonstrate.

TABLE 19

Influence of polyamide concentration on TOFA cloud points

| Additive | Concentration | Cloud Points (° C.) |
|---|---|---|
| No additives | | −6 |
| Uniclear ® 100 | 2% | −13 |
| Uniclear ® 100 | 3% | −17 |
| Uniclear ® 100 | 5% | −18 |
| Uniclear ® 100 | 10% | −17 |

In the second experiment several commercial grades of polyamide were tested to determine the effect on the cloud point of the fatty acid. Table 20 shows that the Uniclear® 100 is a very effective grade of those tested. By studying the composition of the resins it is possible to identify the components which reduce the cloud point of the TOFA. This analysis reveals those resins containing short chain diamines (eg ethylene diamine) are very effective.

TABLE 20

Effect of alternative polyamide chemistry on TOFA cloud point at 5% addition level

| Polyamide additive | Cloud Points (° C.) |
|---|---|
| Uniclear ® 100 | −18 |
| Unirez ® 2540 | −13 |
| Unirez ® 106/1 | −8 |
| Unirez ® 119 | −7 |
| No additive | −6 |
| Unirez ® 5803 | −3 |
| Unirez ® 126 | −2 |
| Unirez ® 141 | −6 |

An alternative method to improve the low temperature properties (5° C. to −10° C.) of fatty acids is by the addition of solvent. Standard Aromatic type solvents as supplied as Shellsol (Shell), Solvesso (ExxonMobil), Caromax (Petrochem) are used. Although this improves the low temperature properties of the product it reduces the concentration of active ingredient, and therefore higher treat rates may be required in some instances.

Alternatively, the mixture of TOFA and polyamide can improve the low temperature properties of the tall oil fatty acids without significantly affecting the required treat rates of the lubricity improver.

For extremely low temperatures (below −10° C.) a combination of polyamide resin and solvent may be used with the fatty acid. The data presented in Table 21 shows that the affect of adding Uniclear® 100 resin on the cloud point of the mixture of TOFA and solvent.

The addition of 20% solvent Xylene to TOFA lowers the cloud point to −14°. Whereas addition of 50% solvent Xylene or Shellsol A100 lowers the cloud point to −20° C. Further, the addition of the Uniclear® 100 to the mixtures of TOFA and solvent reduced the cloud point further, down to minus 38° C. in the best case. In all cases, the addition of polyamide produces a significant reduction in cloud point when compared with TOFA and solvent alone. Also, the magnitude of the effect of the polyamide addition to TOFA and solvent mixtures was more pronounced than with the TOFA alone.

TABLE 21

Effects of the addition of solvents and polyamide on TOFA cloud point

| Fatty acid | Solvent | Additive/conc. | Cloud points ° C. |
|---|---|---|---|
| 100% | | | −6 |
| 80% | 20% Xylene | | −14 |
| 50% | 50% Xylene | | −20 |
| 50% | 50% Shellsol A100 | | −20 |
| 79.6% | 20% Xylene | UC 100/0.4% | −18 |
| 79.2% | 20% Xylene | UC 100/0.8% | −20 |
| 78.4% | 20% Xylene | UC 100/1.6% | −23 |
| 49% | 50% Shellsol A100 | UC 100/1.0% | −38 |

It is important that any change in composition of the additive does not adversely effect the properties of the fuel or serves to enhance properties of the fuel.

To ensure the mixture of TOFA and Uniclear® 100 ("new product") was still an effective fuel additive, the new product was evaluated for Lubricity performance and "no-harm" performance in fuels. The "no-harm" testing was to identify any adverse effects upon the fuel.

Figure 2:
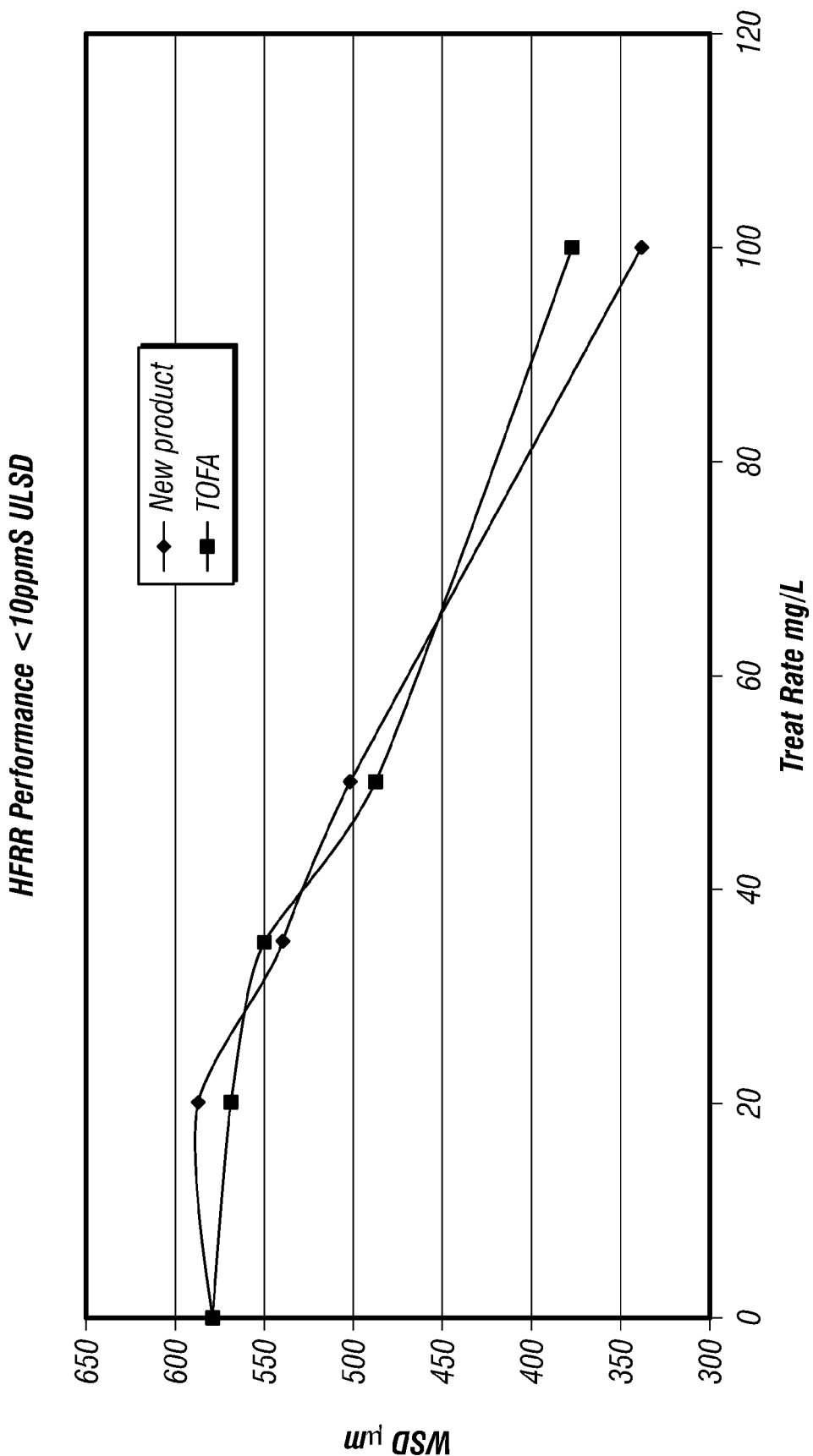
FIG. 2: Comparative data studies of lubricity performance of the compositions of the claimed invention when combined with three ULSD fuels.
Figure 3:
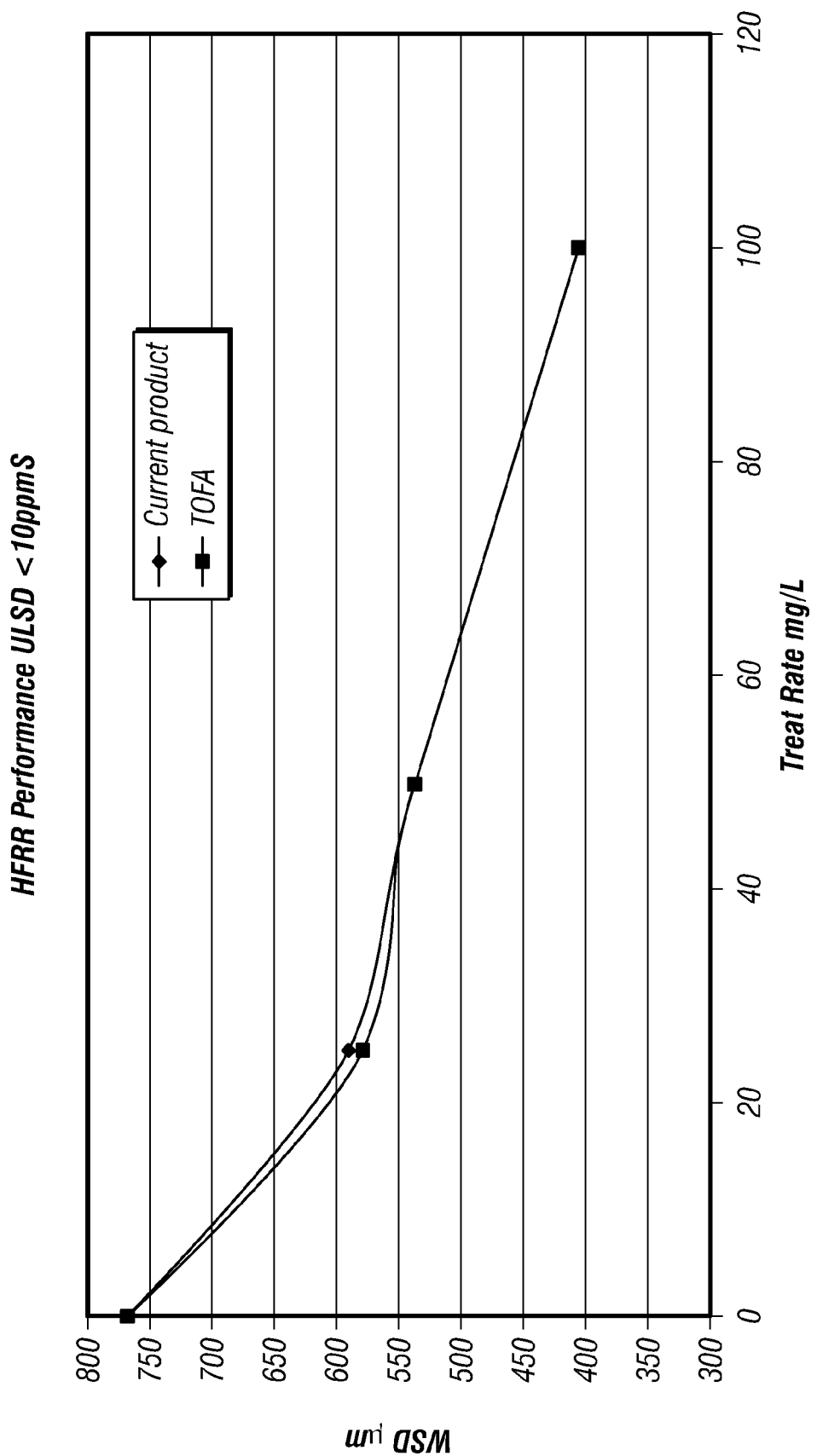
FIG. 3: Comparative data studies of lubricity performance of the compositions of the claimed invention when combined with three ULSD fuels.
Figure 4:
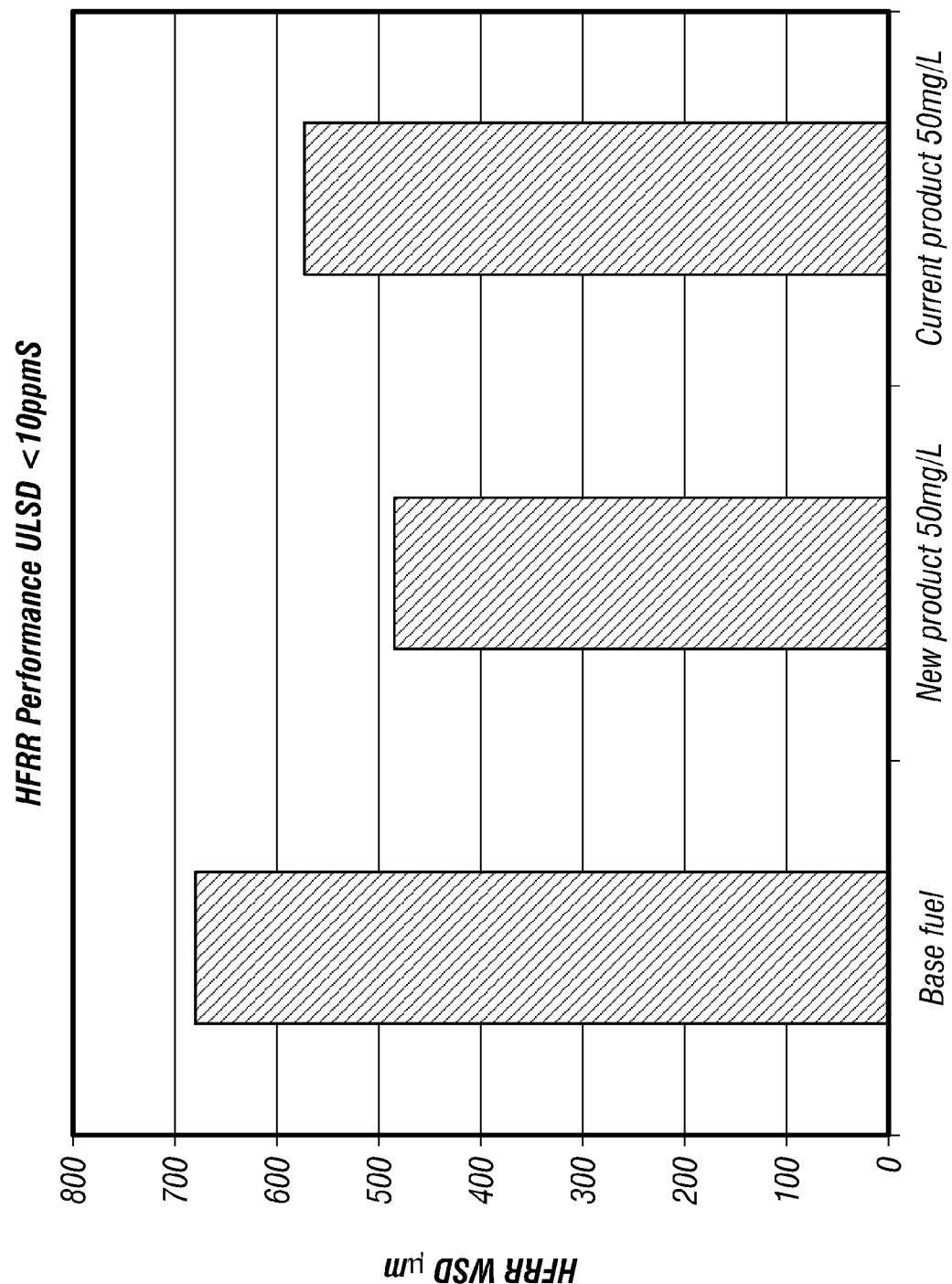
FIG. 4: Comparative data studies of lubricity performance of the compositions of the claimed invention when combined with three ULSD fuels.

Lubricity performance was assessed using the High Frequency Reciprocating Rig (HFRR) equipment (7) according to the ISO 12 156-1 method. For better accuracy, the result is corrected as a function of ambient temperature and humidity. The product was tested in three of ULSD fuels, results are shown in FIGS. 2, 3, and 4. No significant differences were observed between the new product and the TOFA presently used by the industry.

The "no-harm" performance of the product was evaluated using three methods, an oil interaction test, the effect of the additive on the Cold Filter Plugging Point (CFPP) of a range of fuels and effect on fuel cloud point.

For the oil interaction test the new product was tested using three different diesel engine oils using a DGMK type test method (DGMK Forschungsbericht 531, Uberprufung der motorenolvertraglichkelt von dieselkraftstoff-additiven), for results see table 8. All results are within the pass limits for the test, thus no significant differences were observed between the new product and the current product used in the industry

TABLE 22

Results from the oil interaction test.

| Reference Diesel Fuel (RDF) | filtration time 73 s |
|---|---|
| RDF + (New Product + Mobil 15W-40) | filtration time 182 s |

TABLE 22-continued

Results from the oil interaction test.

| | |
|---|---|
| RDF + (New Product + Synthetic Oil 5W-40) | filtration time 158 s |
| RDF + (New Product + Mineral Diesel Oil 10W-40) | filtration time 115 s | pass limit - filtration time below 300 s

For the CFPP tests (EN 116—Diesel and domestic heating fuels—Determination of the Cold Filter Plugging Point (CFPP)), the additive was assessed in 3 base fuels (no low temperature additives) with different CFPP values. The additive was dosed at double the normal treat rate and at the 1% level to demonstrated gross over treatment. The results in Table 23 show no significant differences were observed between the new product and the current product used in the industry.

TABLE 23

CFPP test results

| | Fuel 1, °C. | | Fuel 2, °C. | | Fuel 3, °C. | |
|---|---|---|---|---|---|---|
| | New product | Industry standard | New product | Industry standard | New product | Industry standard |
| Base fuel | −15 | | −9 | | <−30 | |
| 500 mg/L | −15 | −16 | −9 | −9 | <−30 | <−30 |
| 1% wt/wt | −15 | −17 | −9 | −9 | <−30 | <−30 |

For the cloud point tests (ISO 3015—Determination of Cloud Point) on the fuel the additive was assessed in a base fuels (no low temperature additives). The additive was dosed at double the estimated required lubricity treat rate and at the 1% level to determine the effect under gross over treatment conditions. The results in Table 24, show no significant differences in cloud point between the fuel containing the new product and the fuel alone.

TABLE 24

Low temperature properties of the fuel

| | Cloud Point °C. |
|---|---|
| Base fuel | −14 |
| 500 mg/L new product | −15 |
| 1% wt/wt new product | −15 |

Uniflex GE is a mixture of mono, di and tri glycerides produced from TOFA and Glycerol. Table 25 shows the impact of polyamides on Uniflex GE's low temperature stability.

TABLE 25

Uniflex GE

| Additive | treat rate (ppm) | Cloud point (°C.) | Pour Point (°C.) |
|---|---|---|---|
| | | −9 | −27 |
| A2612 | 1000 | −13 | −30 |
| | 5000 | −12 | −30 |
| Uniclear 100 | 1000 | −14 | −30 |
| | 5000 | −12 | −21 |
| C75V | 1000 | −13 | −29 |
| | 5000 | −13 | −21 |
| UR 2540 | 1000 | −12 | −30 |
| | 5000 | −11 | −30 |

Various polyamides improve the Low temperature properties (e.g. Cloud point) of these esters.

Liquid polyamide concentrations may be developed to aid logistics (production, transport, blending) of the additives into fatty acid containing compositions. Table 25 demonstrates the impact of such concentrations of polyamides on the viscosity of the resultant FAC:polyamide composition.

TABLE 26

Rheology temperature sweep measurements may be used to determine the viscosity of the present invention. This measurement is made by determining the rheology of the product with a TA Instruments AR-1000N rheometer in oscillation mode using a 4 cm 2° cone set at the geometric gap.

| Product | Temperature C. | Viscosity mPa · s |
|---|---|---|
| Sylfat 2 LT | 0 | 75 |
| | 20 | 33 |
| concentrate 1 | 0 | 20952 |
| | 20 | 2432 |
| concentrate 2 | 0 | 872 |
| | 20 | 276 |
| | 40 | 111 |

Using a fixed frequency of 1 Hz and an angular frequency of 6,283 rad/s. A temperature sweep is made between −5° C. and 80° C. Complex viscosity can be calculated in Pa · s
concentrate 1 50:50 Sylfat 2LT:Sylvaclear c75
concentrate 2 70:30 Sylfat 2LT:Sylvaclear c75

The viscosity was assessed using a Physica Viscolab LC3/ISO equipment with a standard measuring program, at 23 C with a shear rate of approximately 100 Hz on a range of concentrate ratios. The polyamide (PA) in Table 27 used was Sylvaclear A2612.

TABLE 27

| PA (wt. %) | Day 0 |
|---|---|
| 0 | 26 |
| 25 | 136 |
| 30 | 196 |
| 35 | 273 |
| 40 | 399 |
| 45 | 558 |
| 50 | 833 |

Numerous modifications and variations on the present invention are possible in light of the above teachings. It is, therefore, to be understood that within the scope of the accompanying claims, the invention may be practiced otherwise than as specifically described herein.

As used throughout, ranges are used as a short hand for describing each and every value that is within the range, including all subranges therein.

All of the references, as well as their cited references, cited herein are hereby incorporated by reference with respect to relative portions related to the subject matter of the present invention and all of its embodiments.

What is claimed is:

1. A composition comprising at least one fatty acid or derivative thereof and at least one low temperature stabilizer selected from the group consisting of a branched chain fatty acid and a cyclic fatty acid; wherein the fatty acid derivative comprises:
   (a) at least one derivative selected from the group consisting of an ester containing fatty acid derivative and a nitrogen-containing fatty acid derivative, and
   (b) optionally cyclic fatty acid up to 1 wt % of the fatty acid derivative, wherein further the low temperature stabilizer is present in an amount ranging from 0.1 wt % to 10 wt % of the mixture of the fatty acid or derivative and low temperature stabilizer and any cyclic fatty acid content in the low temperature stabilizer is present in addition to the cyclic fatty acid in the at least one fatty acid derivative such that the low temperature stability of the composition is improved compared to the low temperature stability of the fatty acid or derivative thereof without said stabilizer.

2. The composition according to claim 1, wherein the fatty acid derivative is at least one nitrogen-containing fatty acid derivative selected from the group consisting of an amide-containing fatty acid, an imidazoline-containing fatty acid, an amine containing fatty acid, and an amine carboxylate-containing fatty acid.

3. The composition according to claim 1, wherein the fatty acid derivative is at least one ester-containing fatty acid derivative made by reacting the fatty acid with at least one alcohol selected from the group consisting of a monohydroxyl alcohol and a polyhydroxy alcohol.

4. The composition according to claim 1, comprising at least one fatty acid ester.

5. The composition according to claim 1, comprising at least one fatty acid alkyl ester.

6. The composition according to claim 1, comprising at least one fatty acid and at least one fatty acid alkyl ester.

7. The composition according to claim 1, comprising at least one fatty acid ester that is derived from at least one source selected from the group consisting of rapeseed oil, soy(a) oil, canola oil, palm oil, palm nut oil, sunflower oil, tallow fat, jatropha oil, used cooking oil, vegetable oil and animal fat.

8. The composition according to claim 1, comprising a plurality of fatty acid esters wherein less than 6 wt % of the plurality is saturated fatty acid ester, based upon the total weight of the plurality of fatty acid esters.

9. The composition according to claim 1, comprising a plurality of fatty acid esters wherein at least 6 wt % of the plurality is saturated fatty acid ester, based upon the total weight of the plurality of fatty acid esters.

10. The composition according to claim 1, comprising at least one fatty acid ester derived from reacting a fatty acid with a monoalcohol, wherein the monoalcohol contains from 1 to 20 carbon atoms and is linear, branched, or cyclic.

11. The composition according to claim 1, comprising at least one fatty acid ester derived from reacting a fatty acid with at least one monoalcohol selected from the group consisting of methanol, ethanol, propanol, propan-2-ol, butanol, 2-ethyl-hexanol, and isopropanol.

12. The composition according to claim 1, comprising at least one fatty acid ester derived from reacting a fatty acid with a polyalcohol containing from 2 to 6 hydroxyl groups.

13. The composition according to claim 1, comprising at least one fatty acid ester derived from reacting a fatty acid with a polyalcohol containing from 1 to 20 carbon atoms.

14. The composition according to claim 1, comprising at least one fatty acid ester derived from reacting a fatty acid with at least one polyalcohol selected from the group consisting of ethane-diol, propan-diol, trimethylolpropane, glycerol, poly-glycerol, glucose, carbohydrate and pentaerthritol.

15. The composition according to claim 1, Wherein the fatty acid derivative is or is derived from at least one naturally occurring fatty acid ester.

* * * * *